(12) United States Patent
Park et al.

(10) Patent No.: US 11,953,799 B2
(45) Date of Patent: Apr. 9, 2024

(54) LIGHT SHUTTER PANEL AND TRANSPARENT DISPLAY APPARATUS HAVING THE SAME

(71) Applicant: LG Display Co., Ltd., Seoul (KR)

(72) Inventors: Jaehyun Park, Paju-si (KR); Youngki Song, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 471 days.

(21) Appl. No.: 17/236,873

(22) Filed: Apr. 21, 2021

(65) Prior Publication Data

US 2021/0397061 A1 Dec. 23, 2021

(30) Foreign Application Priority Data

Jun. 23, 2020 (KR) .................. 10-2020-0076565

(51) Int. Cl.
*G02F 1/167* (2019.01)
*G02F 1/1676* (2019.01)
*G02F 1/1679* (2019.01)

(52) U.S. Cl.
CPC ............ *G02F 1/167* (2013.01); *G02F 1/1676* (2019.01); *G02F 1/1679* (2019.01); *G02F 2203/01* (2013.01)

(58) Field of Classification Search
CPC .... G02B 27/0006; G02B 5/005; G02B 5/201; G02B 26/004; G02B 30/24; G02B 30/25; G02B 26/02; G02B 26/005; G02F 1/167; G02F 1/1676; G02F 1/1679; G02F 2203/01; G02F 1/13471; G02F 1/13363; G02F 1/16757; G02F 1/16762; G02F 1/133707; G02F 1/134309; G02F 1/1345; G02F 1/1675; G02F 1/1677; G02F 2201/121; G02F 1/133; G02F 1/13306; G02F 1/1347; G02F 1/141

See application file for complete search history.

(56) References Cited

U.S. PATENT DOCUMENTS

| 2013/0329274 A1* | 12/2013 | Yang | G02B 26/005 |
| | | | 359/290 |
| 2019/0094576 A1* | 3/2019 | Wang | G02F 1/1323 |
| 2019/0302543 A1* | 10/2019 | Chen | G02F 1/134309 |

FOREIGN PATENT DOCUMENTS

JP 2009114281 * 5/2009 ............. C09D 17/00

* cited by examiner

*Primary Examiner* — Brandi N Thomas
(74) *Attorney, Agent, or Firm* — Fenwick & West LLP

(57) ABSTRACT

The present disclosure relates to a light shutter panel and a transparent display apparatus having the same. The light shutter panel according to the present disclosure comprises: a lower electrode plate; a upper electrode plate facing with the lower electrode plate; a shutter layer disposed between the lower electrode plate and the upper electrode plate, the shutter layer including a first ink storage portion disposed at a lower part, a second ink storage portion disposed at a upper part and overlapped with the first ink storage portion, and a first electric field guide disposed between the first ink storage portion and the second ink storage portion; a first black ink filled into the first ink storage portion; and a second black ink filled into the second ink storage portion.

17 Claims, 12 Drawing Sheets

LIGHT SHUTTER PANEL AND TRANSPARENT DISPLAY APPARATUS HAVING THE SAME

CROSS-REFERENCE TO RELATED APPLICATIONS

This application claims the benefit of Republic of Korea Patent Application No. 10-2020-0076565 filed on Jun. 23, 2020, which is hereby incorporated by reference in its entirety.

BACKGROUND

Field of Technology

The present disclosure relates to a light shutter panel and a transparent display apparatus having the same. Especially, the present disclosure relates to a light shutter panel selectively blocking or transmitting the light incident from the back side of the panel, and a transparent display apparatus with the same light shutter panel to selectively blocking or transpassing the background scene of the display device.

Discussion of the Related Art

Devices or apparatuses for displaying images have been developed in various forms such as a CRT (Cathode Ray Tube), a LCD (Liquid Crystal Display), a PDP (Plasma Display Panel), and an electroluminescent display. In particular, the electroluminescent display may include a self-luminous display or a curved self-luminous display. For example, the display may include a light emitting display panel, a micro LED display panel, a flexible light emitting display panel, a flexible micro LED display panel, or a quantum dot light emitting display panel, but it is not limited thereto.

The main purpose of the display apparatus is for providing the video information. In some cases, it may be required to provide the video information with the background scene shown through the display device. To do so, the transparent display apparatus had been suggested for providing the video information from the display device with the background scene passing through the display apparatus, at the same time.

Since the transparent display apparatus according to the related art always provides a background scene, the background scene often hinders for an observer to properly recognize the video information provided from the display itself. The transparent display apparatus may provide an optimal function according to a usage environment. On the contrary, a function of providing video information, which is the main purpose of the display apparatus, may be rather degraded.

SUMMARY

The purpose of the present disclosure, as for solving the problems described above, is to provide a multi-purpose display in which, in accordance of user's selection, the display may be used as a transparent display apparatus for providing the video information with the background scene, or the display may be used as a display apparatus for providing the video information only by disabling the transparent function. Another purpose of the present disclosure is to provide a transparent display apparatus including a light shutter panel having a light blocking function and a light transparenting function, and a transparent display panel disposed front of the light shutter panel for providing video information with the background scene selectively passing the light shutter panel. Still another purpose of the present disclosure is to provide a light shutter panel having a light blocking mode and a light transparenting mode, wherein, for the light transparenting mode, a light transmittance ratio of the light shutter panel is at least 70% of total light intensity provided from the backside of the light shutter panel, and to provide a transparent display apparatus having the same light shutter panel. Yet another purpose of the present disclosure is to provide a transparent display apparatus in which, a distortion of the video information due to the background light intensity may be prevented by completely blocking the light provided from the backside of the light shutter panel, for the light transparenting mode.

In order to accomplish the above mentioned purposes of the present disclosure, a light shutter panel according to the present disclosure comprises: a lower electrode plate; a upper electrode plate facing with the lower electrode plate; a shutter layer disposed between the lower electrode plate and the upper electrode plate, the shutter layer including a first ink storage portion disposed at a lower part, a second ink storage portion disposed at a upper part and overlapped with the first ink storage portion, and a first electric field guide disposed between the first ink storage portion and the second ink storage portion; a first black ink filled into the first ink storage portion; and a second black ink filled into the second ink storage portion.

In one embodiment, the lower electrode plate includes: a lower transparent substrate; and a lower transparent electrode layer disposed on whole upper surface of the lower transparent substrate. The upper electrode plate includes: an upper transparent substrate; and an upper transparent electrode layer disposed on whole upper surface of the upper transparent substrate. The lower electrode plate and the upper electrode plate are joined each other as facing the lower transparent electrode layer and the upper transparent electrode layer.

In one embodiment, the electric field guide includes: a top surface; a bottom surface having the same size and the same shape as the top surface, and being parallel with the top surface; a plurality of first maximum light transmitting portions defining the shape of the bottom surface; a plurality of second maximum light transmitting portions defining the shape of the top surface; a first minimum light blocking portion depressed into the electric field guide from each of the first maximum light transmitting portion; a second minimum light blocking portion depressed into the electric field guide from each of the second maximum light transmitting portion; a first slope surface connecting the first maximum light transmitting portion and the first minimum light blocking portion; and a second slope surface connecting the second maximum light transmitting portion and the second minimum light blocking portion.

In one embodiment, the first ink storage portion is defined by the first maximum light transmitting portion, the first minimum light blocking portion and the first slope surface, the second ink storage portion is defined by the second maximum light transmitting portion, the second minimum light blocking portion and the second slope surface, and the electric field guide defines the first ink storage portion and the second ink storage portion, and includes a material having a refractive index higher than air.

In one embodiment, a straight line connecting a first end point of the bottom surface to a second end point of the top surface has a tilt angle greater than a refractive angle of a refracted light going through the electric field guide after refracted at the first point of the bottom surface.

In one embodiment, an obtuse angle between the first slope surface and the bottom surface is greater than $(90°+\theta_{max})$, here, $\theta_{max}$ is a maximum refracted angle of the refracted light going through the electric field guide after refracted at the first point of the bottom surface.

In one embodiment, an acute angle between the first slope surface and the top surface is selected any one in range from ⅓ of $(90°-\theta_{max})$ to ⅔ of $(90°-\theta_{max})$.

In one embodiment, a minimum separation distance, ΔXmin, between the first end point of the bottom surface and the second end point of the top surface is defined by following equation, $$\Delta X_{min} = T \cdot \tan\theta_{max} = T \cdot \tan\left(\arcsin\left(\frac{n_1}{n_2}\right)\right)$$

here, $n_1$ refers to the refractive index of air (=1.0), $n_2$ refers to a refractive index of the electric field guide, $\theta_{max}$ is a maximum refracted angle of the refracted light going through the electric field guide after refracted at the first point of the bottom surface, and T is a thickness of the electric field guide In one embodiment, the top surface and the bottom surface are surrounded by overlapped areas of the first maximum light transmitting portions and the second maximum light transmitting portions.

In one embodiment, one of the top surface and the bottom surface has a mesh shape, the mesh having a predetermined width.

In one embodiment, the top surface and the bottom surface have island shapes of an equilateral triangle, and disposed as being staggered in a checkered manner.

In one embodiment, the first black ink includes: a transparent fluid; and a plurality of first charged black particles evenly dispersed in the transparent fluid, and charged with a first ion. The second black ink include: the transparent fluid; and a plurality of second charged black particles evenly dispersed in the transparent fluid, and charged with a second ion different from the first ion.

In one embodiment, the light shutter panel further comprises: a first terminal for supplying a first voltage to the lower electrode plate; and a second terminal for supplying a second voltage to the upper electrode plate. In a light transmitting mode, a first voltage opposite to the first ion is applied to the lower electrode plate, and a second voltage opposite to the second ion is applied to the upper electrode plate.

In one embodiment, a summation area of the first minimum light blocking portions and the second minimum light blocking portions is 30% than a plane area of the electric field guide, at most.

In one embodiment, the shutter layer includes: a lower shutter layer having the first ink storage portions; an upper shutter layer having the second ink storage portions; and a common electrode layer disposed between the lower shutter layer and the upper shutter layer.

In one embodiment, the first minimum light blocking portion of the first ink storage portion is separated from the second minimum light blocking portion of the second ink storage portion in a horizontal direction of the plane of the electric field guide.

In one embodiment, the first black ink and the second black ink include: a transparent fluid; and a plurality of charged black particles evenly dispersed in the transparent fluid. In a light transmitting mode, a first voltage having same polarity as the first ion is applied to the common electrode layer, and a second voltage having opposite polarity to the first ion is applied to the upper electrode plate and the lower electrode plate.

Further, a transparent display apparatus according to the present disclosure comprises: a transparent display panel including a plurality of pixels in a matrix manner, each of pixel including an emission area and a transmission area; and a light shutter panel including: a lower electrode plate; an upper electrode plate facing with the lower electrode plate; a shutter layer disposed between the lower electrode plate and the upper electrode plate, the shutter layer including a first ink storage portion disposed at a lower part, a second ink storage portion disposed at a upper part and overlapped with the first ink storage portion, and a first electric field guide disposed between the first ink storage portion and the second ink storage portion; a first black ink filled into the first ink storage portion; and a second black ink filled into the second ink storage portion.

A light shutter panel according to the present disclosure comprises an upper electrode layer, a lower electrode layer, an electric field guide having a minimum light blocking portion and a maximum light transmitting portion, an ink storing portion and a charged black ink filled in the ink storing portion. When driving the charge black ink by applying an electric field between the upper electrode layer and the lower electrode layer, the present disclosure may provide an electric field which does not have any distorted portion by the shape of the electric field guide. In the transparent mode, the charged black ink may be gathered within the minimum light blocking portion, so that there is no degradation of transmittance caused by that the charged black ink is not concentrated within a predetermined area (i.e., the minimum light blocking portion) due to the electric field distortion. Further, by setting the plane area of the minimum light blocking portion to less than 30% of the plane area of the maximum light transmitting portion, the transmittance ratio may be guaranteed to 70% or more.

In addition, the light shutter panel according to the present disclosure may be configured two of unit light shutter panels having the same structure. For example, joined two of unit light shutter panels by arranging the minimum light blocking portions to overlap each other, the light shutter panel may have high transmittance ratio without any reduction of minimum light transmittance ratio (70%) of unit light shutter panel. When transparent spacers are applied into the light shutter panel in order to ensure the high ratio of the light transmittance, in the light blocking mode, the light leakage may be occurred by the scattering phenomena as the lights are passing the transparent spacers. However, the light shutter panel according to the present disclosure may ensure the maximum light blocking ratio by joining two of unit light shutter panels as arranging the transparent spacers of the two of unit light shutter panels are not overlapped each other.

Consequently, a transparent display apparatus according to the present disclosure may provide the background scene with sufficient brightness in the transparent mode, and may provide the video information only without any distortions by fully blocking the lights from the background scene.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
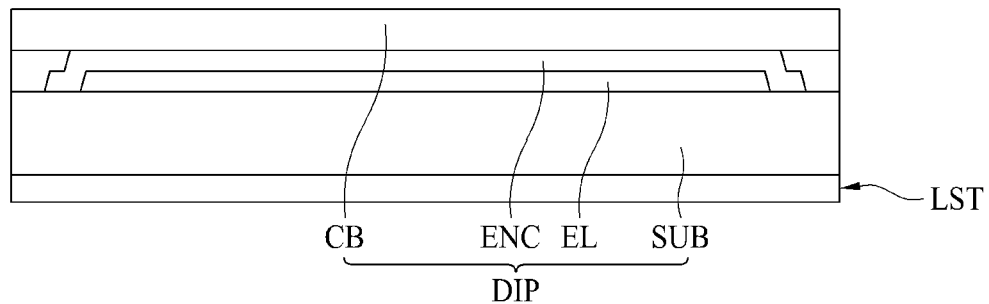
FIG. 1 is a cross sectional view illustrating a transparent display apparatus according to the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case that "comprise," "have," and "include" described in the present specification are used, another part may also be present unless "only" is used. The terms in a singular form may include plural forms unless noted to the contrary.

In construing an element, the element is construed as including an error range although there is no explicit description.

In describing a positional relationship, for example, when the positional order is described as "on," "above," "below," and "next," the case of no contact there-between may be included, unless "just" or "direct" is used. If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as the first, the second, A, B, (a) and (b) may be used. These terms are only to distinguish the elements from other elements, and the terms are not limited in nature, order, sequence or number of the elements. When an element is described as being "linked", "coupled" or "connected" to another element that element may be directly connected to or connected to that other element, but indirectly unless otherwise specified. It is to be understood that other elements may be "interposed" between each element that may be connected to or coupled to.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

Hereinafter, an example of a display apparatus according to the present disclosure will be described in detail with reference to the accompanying drawings. In designating reference numerals to elements of each drawing, the same components may have the same reference numerals as much as possible even though they are shown in different drawings. Scale of the elements shown in the accompanying drawings have a different scale from the actual for convenience of description, it is not limited to the scale shown in the drawings.

Figure 2:
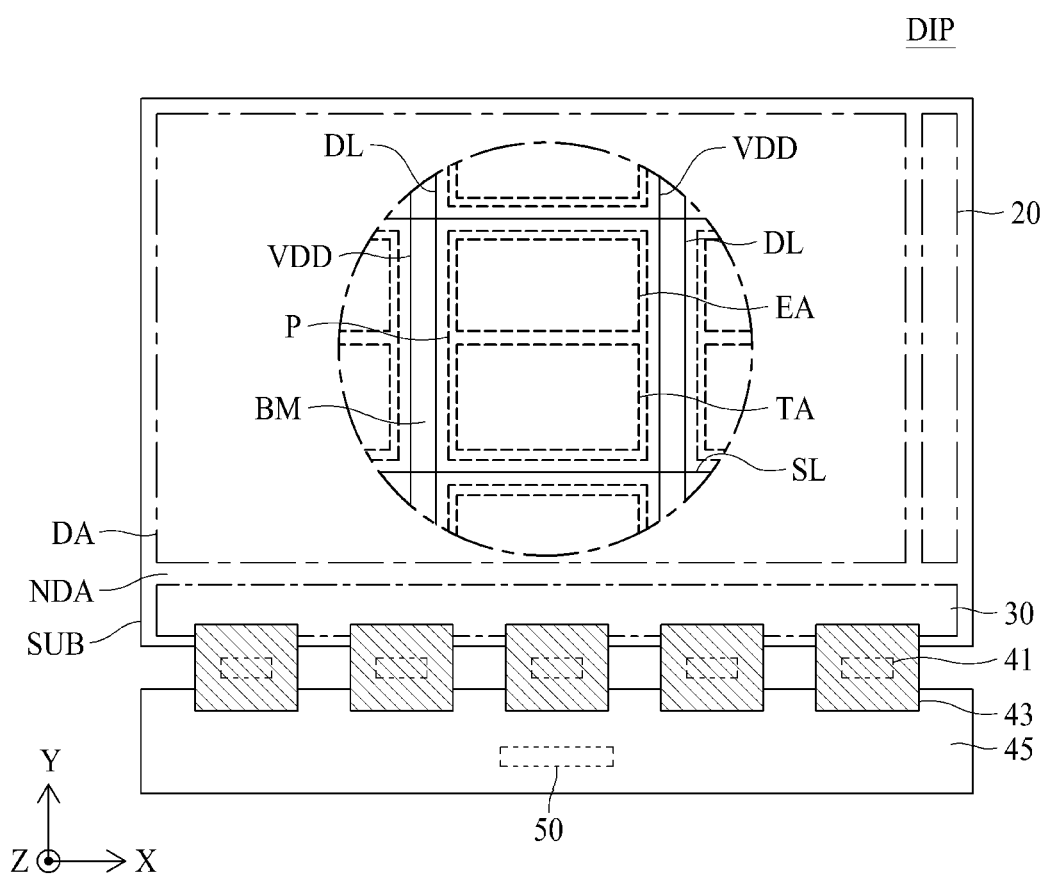
FIG. 2 is a plane view illustrating a transparent display panel of the transparent display apparatus according to one embodiment of the present disclosure.

Hereinafter, referring to FIGS. 1 and 2, a transparent display apparatus according to the present disclosure will be explained. FIG. 1 is a cross sectional view illustrating a transparent display apparatus according to the present disclosure. FIG. 2 is a plane view illustrating a transparent display panel of the transparent display apparatus according to one embodiment of the present disclosure.

Referring to FIG. 1, a transparent display apparatus according to the present disclosure comprises a transparent display panel DIP and a light shutter panel LST. The light shutter panel LST may be attached at the rear surface of the transparent display panel DIP. The light shutter panel LST may be an optical panel which is selective operated in a light transmitting mode for transpassing the light through the optical panel or in a light blocking mode for blocking the light not to be passing the optical panel. For example, in the light transmitting mode, the light incident from the rear side is transmitted almost through the optical panel, so the background scene may be acknowledged from the front side of the optical panel, as it may be a glass. On the contrary, in the light blocking mode, almost of all light incident from the rear side into the optical panel are blocked, so the background scene may be not invisible in front side of the optical panel, as it was covered with blinds or curtain.

The transparent display panel DIP may include a transparent substrate SUB, a display layer EL formed on the transparent substrate SUB, an encapsulation layer ENC covering the display layer EL, and a cover plate CB disposed on the encapsulation layer ENC.

The transparent display panel DIP may be any one selected display panel of a liquid crystal display panel, a plasma display panel, and an electroluminescent display panel. For the case that the electroluminescent display panel is used, the transparent display panel DIP may include a self-luminescent display panel or a curved self-luminescent display panel. In detail, the transparent display panel DIP may include a light emitting display panel, a micro light emitting display panel, a flexible light emitting display panel, a flexible micro light emitting display panel, or a quantum dot display panel.

The transparent substrate SUB of the transparent display panel DIP may be made of a transparent material. The display layer EL may include a plurality of pixel areas (or pixels) P arrayed in a matrix manner Each pixel area P may include a driving element (not shown) and a light emitting element (not shown). The driving element may include thin film transistors and a storage capacitor. The light emitting element may be an electroluminescent element of which luminescent may be controlled by the driving element. The electroluminescent element may include an organic light emitting diode or an inorganic light emitting diode.

The encapsulation layer ENC may be protecting the display layer EL and prevents or reduces gases or foreign materials from intruding from the outside. The encapsulation layer ENC may have a structure in which an inorganic layer and an organic layer are alternately stacked. It is preferable that the encapsulation layer ENC is formed of a transparent material.

The cover plate CB may be a plate or substrate having a high strength and transparent property such as a glass or plastic. For example, the cover plate CB may be a transparent protective plate for preventing or reducing damage to the encapsulation layer ENC and display layer EL due to external impacts.

Hereinafter, referring to FIG. 2, a plane structure of the transparent display panel DIP will be explained. The transparent display panel DIP may include a transparent substrate SUB, a gate (or scan) driver 20, a data pad portion 30, a source driving integrated circuit 41, a flexible wiring film 43, a circuit board 45 and a timing controller 50.

The transparent substrate SUB may include a display area DA and a non-display area NDA. The display area DA is for representing video information, and may be defined in most of the middle portion of the transparent substrate SUB, but it is not limited thereto. The display area DA may include a plurality of pixel areas P arrayed in a matrix manner Each of the pixel areas P may have a rectangular shape surrounded by a scan line (or gate line) SL, a data line DL and a driving current line VDD. Even though it is not shown in figure, each pixel area P may include a switching thin film transistor, a driving thin film transistor, a storage capacitor and an organic light emitting diode.

The transparent substrate SUB may include a plurality of pixels P arrayed in a matrix manner Each pixel P may have an emission area EA and a transmission area TA. Each pixel P may further include a non-emission area BM. For example, between two pixels P, the non-emission area BM may be disposed. For example, between two neighboring pixels P, a black matrix (non-emission area) BM having a predetermined width may be disposed. That is, a plurality of pixels P are arrayed in a matrix matter, a non-emission area BM having a mesh shaped black matrix is disposed between pixels P. In some cases, the area excepting the non-emission area BM may be defined as the pixel P.

A pixel P, in the area except the transmission area TA, may include an organic light emitting diode, a switching thin film transistor, a driving thin film transistor, a storage capacitor, a scan line SL, a data line DL and a driving current line VDD. For an example, the scan line SL, the data line DL and the driving current line VDD for defining the pixel area P may be disposed at the non-emission area BM. The switching thin film transistor, the driving thin film transistor, the storage capacitor and the organic light emitting diode may be disposed in the emission area EA. For another example, the scan line SL, the data line DL, the driving current line VDD and the switching thin film transistor may be disposed at the non-emission area BM, and the driving thin film transistor, the storage capacitor and the organic light emitting diode may be disposed in the emission area EA.

An emission area EA may represent one color of light. For an example, any one-color of light of red, green and blue may be generated from one emission area EA. Three pixels P, each pixel having an emission area EA representing one-color of light and a transmission area TA, may be gathered or grouped to form one unit pixel. Even though it is not shown in figure, for another example, an emission area EA may include any one-color of light selected from red, green, blue and white color light. In this case, four pixels P representing 4 different colors of light in each pixel may be grouped to form one unit pixel.

The non-display area NDA is an area in which the video information is not displayed, and may be defined at the circumference area of the transparent substrate SUB as surrounding all or some portions of the display area DA. The non-display area NDA may include the gate driver 20 and the data pad portion 30.

The gate driver 20 may supply the scan (or gate) signal to the scan lines in accordance with the gate control signal received from the timing controller 50. The gate driver 20 may be formed in the non-display area NDA disposed at one side of the display area DA on the transparent substrate SUB with the GIP (Gate driver In Panel) type. The GIP type may refer to a structure in which a gate driver 20 including thin film transistors and capacitors is directly formed on the transparent substrate SUB.

The data pad portion 30 may supply the data signals to the data lines DL in accordance with the data control signal received from the timing controller 50. The data pad portion 30 may be formed as a chip type and mounted on the flexible wiring film 43. The flexible wiring film 43 may be attached at the non-display area NDA disposed at one outside of the display area DA of the transparent substrate SUB by the TAB (Tape Automated Bonding) method.

The source driving integrated circuit 41 may receive the digital video data and the source control signals from the timing controller 50. The source driving integrated circuit 41 may convert the digital video data into the analog data voltages in accordance with the source control signal, and supply the analog data voltages to the data lines DL. When the source driving integrated circuit 41 is formed as a chip type, it may be mounted on the flexible wiring film 43 by the COF (Chip On Film) method or COP (Chip On Plastic) method.

The flexible wiring film 43 may include wirings for connecting the data pad portion 30 to the source driving integrated circuit 41, and for connecting the data pad portion 30 to the circuit board 45. The flexible wiring film 43 may be mounted on the data pad portion 30 using an anisotropic conducting film, so the data pad portion 30 may be connected to the wirings of the flexible wiring film 43.

The circuit board 45 may be attached to the plurality of flexible wiring films 43. The circuit board 45 may have a plurality of circuits represented in the driving chip type. For example, the timing controller 50 may be mounted on the circuit board 45. The circuit board 45 may be a printed circuit board or a flexible printed circuit board.

The timing controller 50 may receive the digital video data and the timing signals from an external system board through a cable connected to the circuit board 45. The timing controller 50 may generate the gate control signals for controlling the operation timing of the gate driver 20 and the source control signals for controlling the source driving integrated circuit 41, based on the timing signals. The timing controller 50 may supply the gate control signals to the gate driver 20, and supply the source control signal to the source driving integrated circuit 41. In some cases, the timing controller 50 may be manufactured in one driving chip as including the source driving integrated circuit 41 and then mounted on the transparent substrate SUB.

The timing controller 50 may be connected to the light shutter panel LST. According to the input of the user and in conjunction with the operation of the transparent display panel DIP, the light shutter panel LST may be operated in the light transmitting mode or in the light blocking mode. In one example, even though it is not shown in figure, the timing controller 50 may be connected to the voltage supplier configured to supply the electric driving voltage in accordance with the operation mode of the light shutter panel LST.

The transparent display panel DIP may include an emission area EA providing the video information and a transmission area TA passing through the background scene of the display panel as it is. The arrangement of the emission area EA and the transmission area TA may be variously configured on the transparent substrate SUB.

Figure 3A:
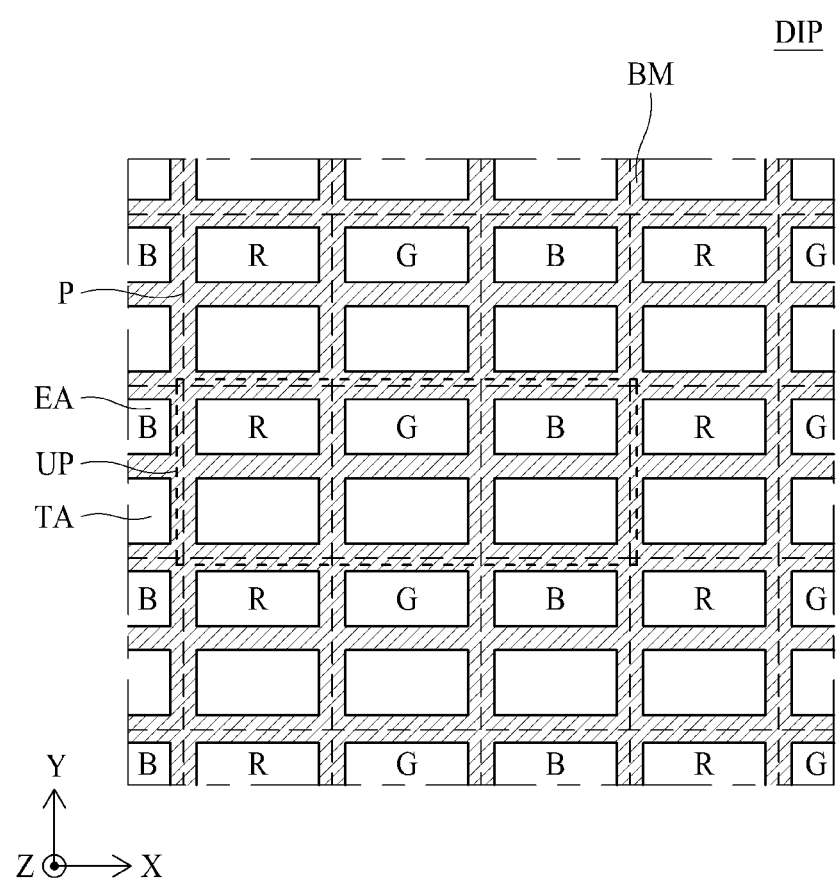
FIGS. 3A to 3C are plane views illustrating various pixel structures of the transparent display apparatus according to embodiments of the present disclosure.
Figure 3B:
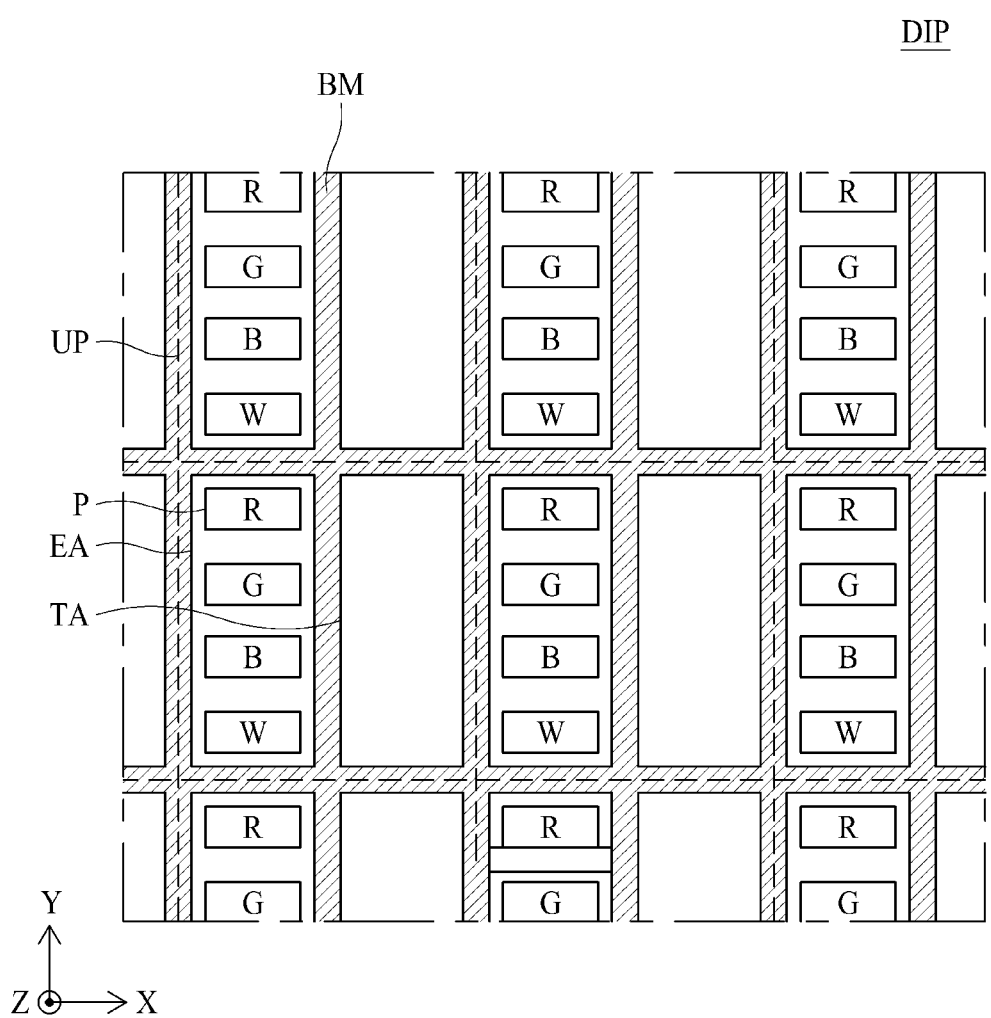
Figure 3C:
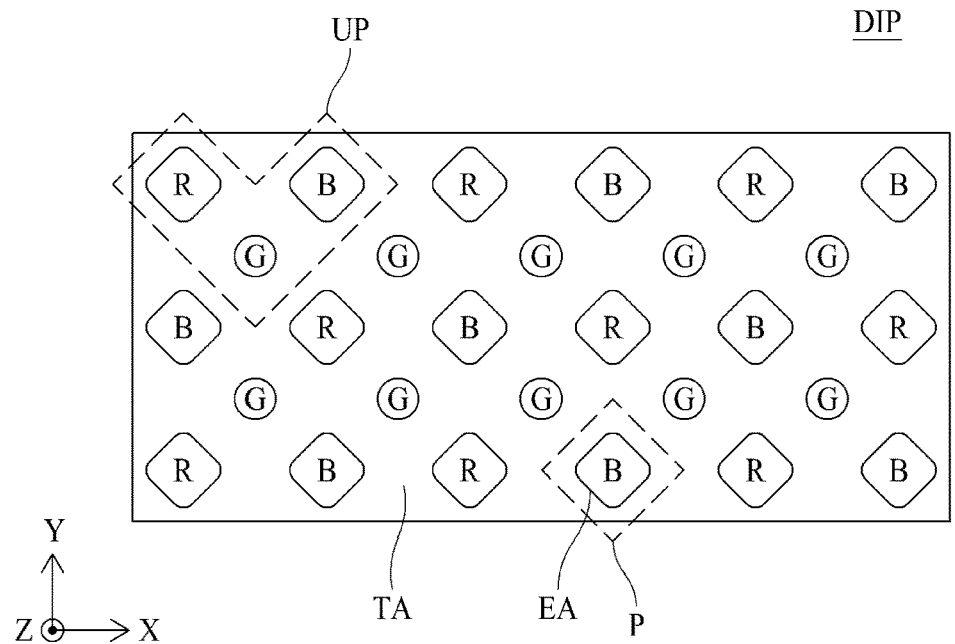

Hereinafter, referring to FIGS. 3A to 3C, various embodiments for the emission area EA, transmission area TA and non-emission area BM in the transparent display panel DIP will be explained. FIGS. 3A to 3C are plane views illustrating various pixel structures of the transparent display apparatus according to the present disclosure.

In one example, as shown in FIG. 3A, a plurality of pixels P may be disposed in a matrix manner A pixel P may include an emission area EA and a transmission area TA. A non-emission area BM may be disposed as surrounding the emission area EA and the transmission area TA, so the non-emission area BM may have the mesh shape over the whole surface of the transparent substrate SUB.

Each emission area EA included in the three pixels P arrayed in series may be allocated with any one of a red-light emitting element R, a green light emitting element G or a blue light emitting element B. These three pixels P are grouped with each other to form a unit pixel UP. FIG. 3A shows the case in which a red-light emitting element R, a green light emitting element G and a blue light emitting element B are allocated at the three consecutive pixels P along the horizontal direction (X-axis). In this case, along the vertical direction (Y-axis), the same color pixels are disposed. The transmission area TA may have a horizontal striped shape along the X-axis, and arrayed along the vertical direction (Y-axis).

In another example, as shown in FIG. 3B, a plurality of unit pixels UP are arrayed in a matrix manner. In a unit pixel UP, an emission area EA and a transmission area TA may be defined. Further, a non-emission area BM may be disposed as surrounding the emission area EA and the transmission area TA.

In the emission area EA of any one of unit pixel UP, four pixels P may be disposed. These four pixels P are successively arrayed along the vertical direction (Y-axis) in one-unit pixel UP. In one example, four pixels P may be allocated as being arrayed with a red-light emitting element R, a green light emitting element G, a blue light emitting element B and a white light emitting element W. In another example, the non-emission area BM may be further included between the pixels P.

In this case, the emission area EA may have a vertical striped shape along the vertical direction (Y-axis) and be arrayed along the horizontal direction (X-axis). Further, the transmission area TA may have a vertical striped shape along the vertical direction (Y-axis) and be arrayed along the horizontal direction (X-axis).

In still another example, as shown in FIG. 3C, a plurality of emission areas EA are disposed in a pentile manner. In this case, the emission areas EA may have different sizes from each other. For one example, the emission areas EA allocated with the red-light emitting element R and the blue light emitting element B may have a first size, the emission area EA allocated with the green light emitting element G may have a second size that is less than the first size.

In addition, the shapes of the emission areas EA may have different shapes from each other. For example, the emission area EA allocated with the red-light emitting element R and the blue light emitting layer B may have polygonal shapes such as a rectangular shape, a rhombus shape or hexagonal shape. On the contrary, the emission area EA allocated with the green light emitting element G may have a circular shape. The pixel P including the red-light emitting element R or the green light emitting element G may be defined as the rhombus shapes.

In addition, the red-light emitting element R, the blue light emitting element B and the green light emitting element G may disposed as forming a triangular shape. For example, the unit pixel UP may have a '\/' shape or a '/\' shape.

In the above various examples, the arrangement structures of the emission area EA and the transmission area TA according to three different types. However, it is not restricted thereto, further various type may be applied.

Hereinafter, referring to the figures, the light shutter panel LST will be explained in detail. The light shutter panels LST according to following examples may disposed at the rear side of the transparent display panels DIP explained above, for tranpassing the lights and for blocking the lights incident from the rear side of the transparent display panel DIP, selectively.

First Embodiment

Figure 4A:
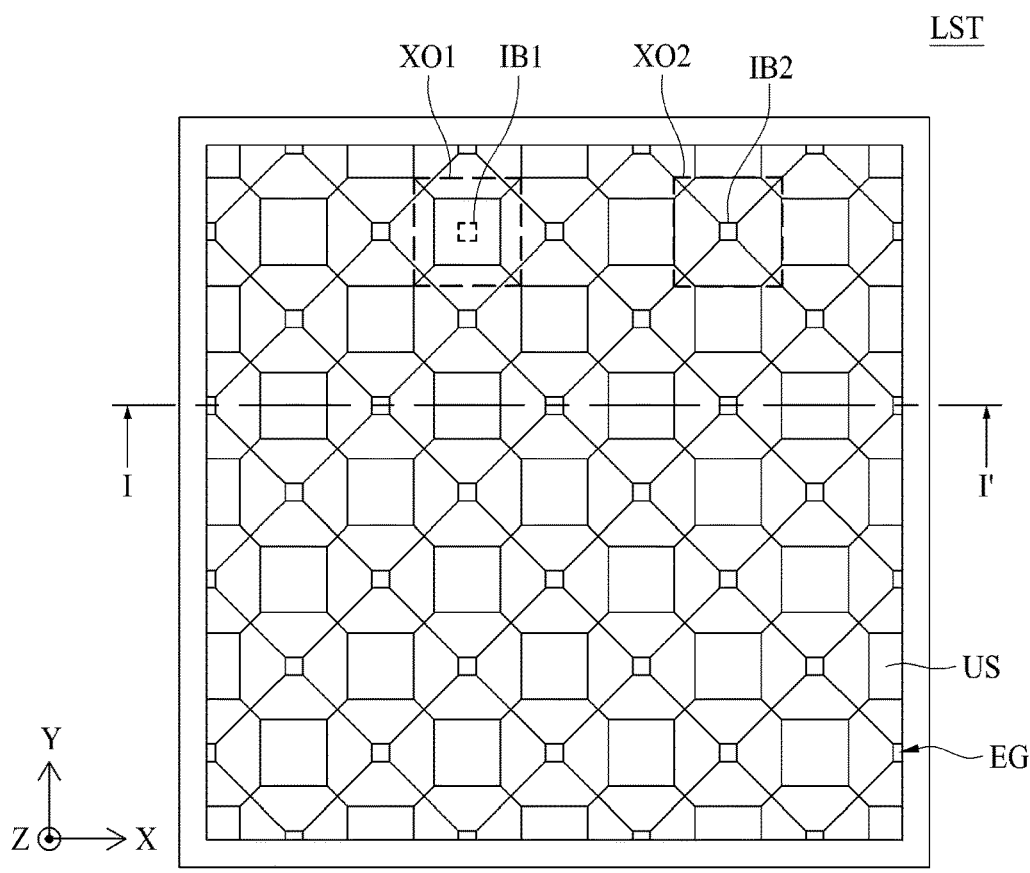
FIG. 4A is a plane view illustrating a structure of the light shutter panel according to a first embodiment of the present disclosure.
Figure 4B:
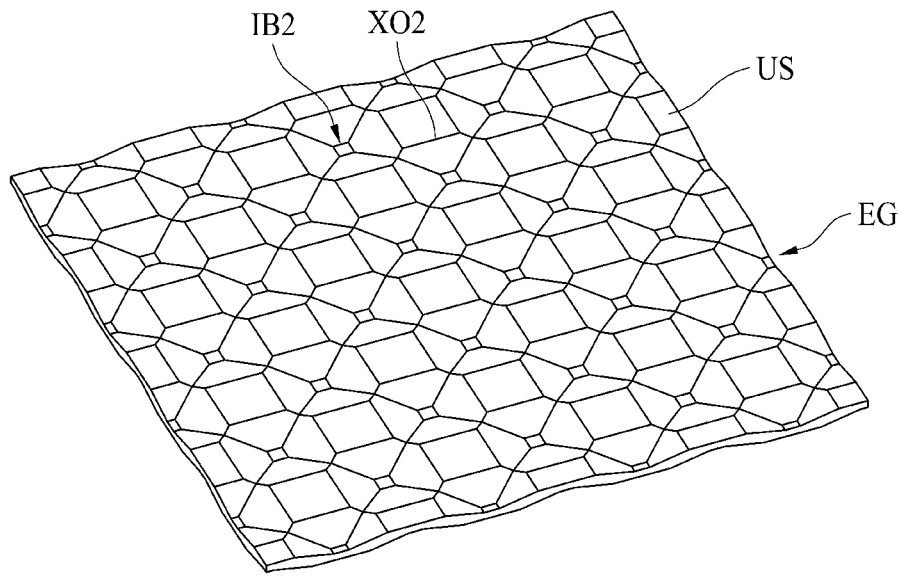
FIG. 4B is a perspective view illustrating a structure of the light shutter panel according to the first embodiment of the present disclosure.
Figure 4C:
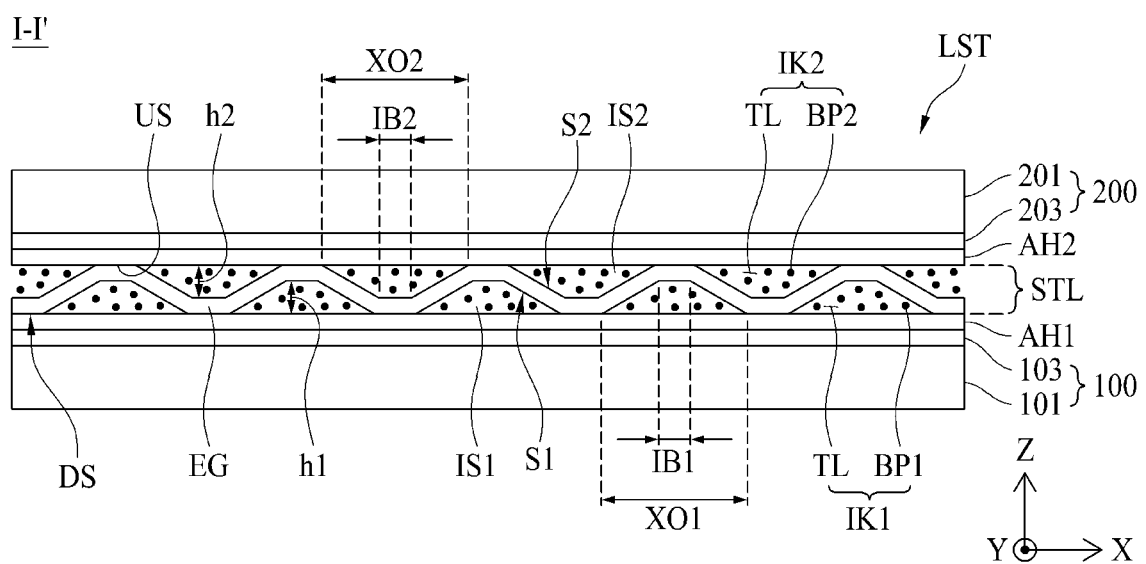
FIG. 4C is a cross-sectional view, along cutting line I-I' in FIG. 4A, illustrating a structure of the light shutter panel according to the first embodiment of the present disclosure.

Hereinafter, referring to FIGS. 4A to 4C, a light shutter panel LST according to the first embodiment of the present disclosure will be explained. FIG. 4A is a plane view illustrating a structure of the light shutter panel according to the first embodiment of the present disclosure. FIG. 4B is a perspective view illustrating a structure of the light shutter panel according to the first embodiment of the present disclosure. FIG. 4C is a cross-sectional view, along cutting line I-I in FIG. 4A, illustrating a structure of the light shutter panel according to the first embodiment of the present disclosure.

The light shutter panel LST according to the first embodiment of the present disclosure may include a lower electrode plate 100, an upper electrode plate 200, a shutter layer STL, a first black ink IK1 and a second black ink IK2. The lower electrode plate 100 and the upper electrode plate 200 may be joined as to be faced each other with a predetermined interval. For example, the lower electrode plate 100 may be bonded to a lower portion of the shutter layer STL by a first adhesive AH1 therebetween. Further, the upper electrode plate 200 may be bonded to upper portion of the shutter layer STL by a second adhesive AH2. In this case, the gap between the lower electrode plate 100 and the upper electrode plate 200 may be corresponding to the thickness of the shutter layer STL.

The shutter layer STL may include a top surface US, a bottom surface DS, a first maximum light transmitting portion XO1, a second maximum light transmitting portion XO2, a first minimum light blocking portion IB1, a second minimum light blocking portion IB2, a first ink storage portion IS1, a second ink storage portion IS2 and an electric field guide EG. The main elements for the shutter layer STL may include the electric field guide EG, the first ink storage portion IS1 and the second ink storage portion IS2. Other elements may be the elements for defining the first ink storage portion IS1 and the second ink storage portion IS2.

The first ink storage portion IS1 may be a space formed by depression of a first height h1 inward from the bottom surface DS of the shutter layer STL. The second ink storage portion IS2 may be a space formed by depression of a second height h2 inward from the top surface US of the shutter layer STL. The first ink storage portion IS1 and the second ink storage portion IS2 may be the spaces formed at the electric field guide EG. Especially, the first ink storage portion IS1 may be disposed at the lower portions based on the intermediate height of the electric field guide EG. The second ink storage portion IS2 may be disposed at the upper portions based on the intermediate height of the electric field guide EG.

A plurality of the first maximum light transmitting portion XO1 may be arrayed in a matrix manner with a predetermined distance at the lower portions of the electric field guide EG. For example, the first maximum light transmitting portions XO1 may be arranged in a checkered pattern (or, western chessboard). In detail, the first maximum light transmitting portions XO1 may be arrayed in a matrix manner, and be arranged in a cross-array structure in each odd-numbered row and even-numbered row, alternately. At four corners of any one of first maximum light transmitting portion XO1, another first maximum light transmitting portion XO1 is disposed at a diagonal direction, by overlapped each other with a predetermined width. As the result, all of the first maximum light transmitting portions XO1 may be spatially connected through these overlapping corners.

Between neighboring two of the plurality of the first maximum light transmitting portions XO1, the bottom surface DS may be disposed. For example, the bottom surface DS may have a right rectangular shape, and one of the first maximum light transmitting portion XO1 may be disposed at each side. Therefore, each of the bottom surface DS may have an island shape, and the plurality of the bottom surface DS may be arranged in the checkboard manner.

A plurality of the second maximum light transmitting portion XO2 may be arrayed in a matrix manner with a predetermined distance at the upper portions of the electric field guide EG. The plurality of the second maximum light transmitting portion XO2 may be arrayed in the same manner as the first maximum light transmitting portion XO1. One of the second maximum light transmitting portion XO2 may be disposed between two of the first maximum light transmitting portion XO1 neighboring each other. Between neighboring two of the plurality of the second maximum light transmitting portions XO2, the top surface US may be disposed. For example, the top surface US may have a right rectangular shape, and one of the second maximum light transmitting portion XO2 may be disposed at each side. Therefore, each of the top surface US may have an island shape, and the plurality of the top surface US may be arranged in the checkboard manner.

In the first embodiment of the present disclosure, the light shutter panel LST may perfectly block the light in the light blocking mode. Therefore, in one embodiment the first maximum light transmitting portion XO1 disposed as surrounding the bottom surface DS may be overlapped with the second maximum light transmitting portion XO2 disposed as surrounding the top surface US. In addition, the arrangement of the top surface US and the bottom surface DS may have a structure in which a plurality of squares may be spaced apart from each other, and may be spatially crossed or staggered each other. Therefore, each of the top surfaces and the bottom surfaces may be surrounded by the areas where the first maximum light transmitting portion XO1 and second maximum light transmitting portion XO2 are overlapped.

One of the first minimum light blocking portion IB1 may be disposed at a position depressed in a certain depth from the bottom surface DS to the inside of the electric field guide EG. One of the second minimum light blocking portion IB2 may be disposed at a position depressed in a certain depth from the top surface US to the inside of the electric field guide EG. For example, the first minimum light blocking portion IB1 may be overlapped with the middle portion of the first maximum light transmitting portion XO1. Further, the second minimum light blocking portion IB2 may be overlapped with the middle portion of the second maximum light transmitting portion XO2.

The first ink storage portion IS1 may be a space connecting the first maximum light transmitting portion XO1 and the first minimum light blocking portion IB1. The second ink storage portion IS2 may be a space connection the second maximum light transmitting portion XO2 and the second minimum light blocking portion IB2. For example, each of the first maximum light transmitting portion XO1 and the first minimum light blocking portion IB1 may have square shapes in which their middle points are overlapped each other, and they are disposed as being apart with a first height (or a first depth) h1 each other. In addition, each of the second maximum light transmitting portion XO2 and the second minimum light blocking portion IB2 may have square shapes in which their middle points are overlapped each other, and they are disposed as being apart with a second height (or a second depth) h2 each other.

As a result, the first ink storage portion IS1 may have a square frustum shape. Here, the base surface of the square frustum shape may be corresponding to the first maximum light transmitting portion XO1, the upper surface may be corresponding to the first minimum light blocking portion IB1, and the first slope surface S1 may be corresponding to the electric field guide EG. The second ink storage portion IS2 may also have a square frustum shape. The base surface of the square frustum shape may be corresponding to the second maximum light transmitting portion XO2, the upper surface may be corresponding to the second minimum light blocking portion IB2, and the slope surface may be corresponding to the electric field guide EG.

In other words, the electric field guide EG may have a structure of surrounding the first ink storage portion IS1 and the second ink storage portion IS2. The electric field guide EG may have a bumply bend shape by the first ink storage portion IS1 and the second ink storage portion IS2 which they may have a cross-arrangement structure. Therefore, the electric field guide EG may be formed by imprinting a substrate made of a transparent material with a molding, so that the electric field guide EG have a structure in which the first maximum light transmitting portion XO1 and the first minimum light blocking portion IB1 are connected and the second maximum light transmitting portion XO2 and the second minimum light blocking portion IB2 are connected.

The first black ink IK1 may be filled in the first ink storage portion IS1 of the shutter layer STL. The second black ink IK2 may be filled in the second ink storage portion IS2 of the shutter layer STL. The first black ink IK1 may include a transparent fluid TL and a first charged black particle BP1 dispersed into the transparent fluid TL. The second black ink IK2 may include a transparent fluid TL and a second charged black particle BP2 dispersed into the transparent fluid TL. For example, the first charged black particle BP1 and the second charged black particle BP2 may include the electrophoretic materials.

The transparent fluid TL may be an uncharged liquid such as a pure water or pure oil. In one embodiment, the transparent fluid TL may have the same refractive index as the electric field guide EG. The first charged black particle BP1 may be charged with negative ion or positive ion, and evenly dispersed into the transparent fluid TL. The second charged black particle BP2 may be charged with ion different from the ion of the first charged black particle BP1, and evenly dispersed into the transparent fluid TL. By applying an electric field to the first and the second charge black inks IK1 and 1K2, the distribution state of the first and the second charged black particle BP1 and BP2 may be moved so as to be concentrated to any one place.

For one example, in a state that an electric field is not applied, the first charged black particles BP1 may be evenly distributed or dispersed in the first ink storage portion IS1, and the second charged black particles BP2 may be evenly distributed or dispersed in the second ink storage portion IS. Therefore, the whole area of the first and the second ink storage portions IS1 and IS2 may be in the light blocking states. When an electric field is applied so as for concentrating the first and the second charged black particles BP1 and BP2 into the first and the second minimum light blocking portions IB1 and IB2, respectively, the most area of the first and the second ink storage portions IS1 and IS2 may be in the light transmitting states.

The lower electrode plate 100 may include a lower transparent substrate 101 and a lower transparent electrode layer 103. The lower transparent substrate 101 may be a transparent substrate such as a glass or plastic substrate. In some cases, the lower transparent substrate 101 may be made in a film type having excellent flexibility. The lower transparent substrate 101 of the lower electrode plate 100 may have a rectangular plate structure including a first axis (or horizontal axis) X and a second axis (or vertical axis) Y.

The lower transparent electrode layer 103 may be deposited on the whole upper surface of the lower transparent substrate 101. The lower transparent electrode layer 103 may include a transparent conductive material such as an indium-tin oxide (ITO), indium-zinc oxide (IZO) or indium-gallium-zinc oxide (IGZO). Even though it is not shown in figures, a protective layer may be stacked on the whole upper surface of the lower transparent electrode layer 103.

The upper electrode plate 200 may have a shape and a plane area the same with those of the lower electrode plate 100. The upper electrode plate 200 may include an upper transparent substrate 201 and an upper transparent electrode layer 203. The upper transparent substrate 201 of the upper electrode plate 200 may have a rectangular plate structure including a first axis (or horizontal axis) X and a second axis (or vertical axis) Y. The upper transparent electrode layer 203 may be deposited on the whole upper surface of the upper transparent substrate 201. The upper transparent electrode layer 203 may include a transparent conductive material.

The lower electrode plate 100 may be attached on the bottom surface DS of the electric field guide EG by the first adhesive layer AH1 disposed on the lower transparent electrode layer 103. The upper electrode plate 200 may be attached on the top surface US of the electric field guide EG by the second adhesive layer AH2 disposed on the upper transparent electrode layer 203. As the result, the lower electrode plate 100 and the upper electrode plate 200 may be assembled as the lower transparent substrate 101 is facing with upper transparent substrate 201.

Figure 5:
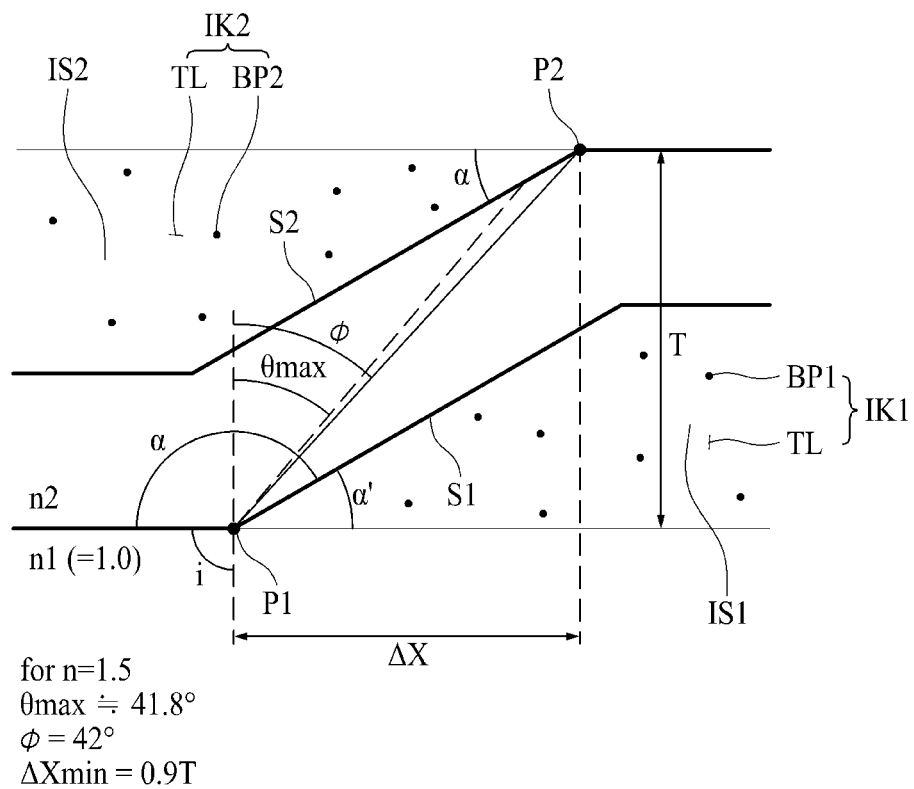
FIG. 5 is an enlarged cross-sectional view illustrating a structure of the shutter layer according to the first embodiment of the present disclosure.

Hereinafter, referring to FIG. 5, the structures of the first ink storage portion IS1 and the second ink storage portion IS2 formed at the electric field guide EG will be explained in detail. FIG. 5 is an enlarged cross-sectional view illustrating a structure of the shutter layer according to the first embodiment of the present disclosure. The following description may be for explaining a minimum condition in which the first maximum light transmitting portion XO1 and the second maximum light transmitting portion XO2 overlap in order to completely block light.

The electric field guide EG may include an optical material having a refractive index higher than air. For example, the electric field guide EG may be made of a transparent resin material such as a polycarbonate (PC) or a poly methyl methacrylate (PMMA) of which refractive index may be any one value in range of 1.4 to 1.6.

All incident light from the outside of the electric field guide EG into the electric field guide EG within the range of 0 to 90 degrees (incident angle, i) with respect to the normal line of the incident surface may be refracted into the range of 0 to $\theta_{max}$ (maximum refractive angle) degrees, according to Snell's law at the interface between the electric field guide EG and air (see Equation 1). For an example, when the electric field guide EG is made of a material having the 1.5 of the refractive index ($n_2$), the maximum refractive angle ($\theta_{max}$) may be about 4.18 degree. In other words, all lights incident from the outside into the electric field guide EG may refracted into the electric field guide EG within the refraction angle range of 0 to 41.8 degree.

$$\frac{n_2}{n_1} = \frac{\sin\theta}{\sin i}, \theta_{max} = \arcsin\left(\frac{\sin i_{max} \cdot n_1}{n_2}\right)$$ Equation 1

Here, $n_1$ refers to the refractive index of air, i.e., 1.0, $n_2$ refers to the refractive index of the electric field guide EG, 'i' is the incident angle, i.e., $0° \le i \le 90°$, and $\theta_{max}$ is the maximum refractive angle. The maximum refractive angle is the refracted angle of light having the maximum incident angle imax (=90°).

When $n_2$=1.5, $0° < \theta_{max} < 41.8°$. Therefore, in the view point of the relationship between the bottom surface DS and the top surface US facing each other, in one embodiment the inclination angle of a straight line connecting the first end point P1 of the bottom surface DS to the second end point P2 of the top surface US between the closest adjacent bottom surface DS and top surface US may be greater than $\theta_{max}$. For example, when the refractive index of the electric field guide EG is 1.5, the slanted angle, φ, of the straight line connecting the first end point P1 of the bottom surface DS to the second end point P2 of the top surface US (i.e., the tilting angle to the normal line of the bottom surface DS) may be greater than 41.8°. For an instance, it may be defined as $\varphi_{min}$=42°.

Here, the first end point P1 of the bottom surface DS may be corresponding to the end point of the first maximum light transmitting portion XO1, and the second end point P2 of the top surface US may be corresponding to the end point of the second maximum light transmitting portion XO2. In another words, the above condition may be described as a condition of a minimum horizontal separation distance between the first end point P1 and the second end point P2, or a condition of a minimum overlapping area in plane view between the first maximum light transmitting portion XO1 and the second maximum light transmitting portion XO2. Hereinafter, the optimized condition for the design of the electric field guide EG may be explained in the view point of the minimum horizontal separation distance. The minimum horizontal separation distance ($\Delta X_{min}$) at which the second end point P2 of the bottom surface DS is separated from the first end point P2 of the bottom surface DS may be determined by the following Equation 2.

$$\Delta X_{min} = T \cdot \tan\theta_{max} = T \cdot \tan\left(\arcsin\left(\frac{n_1}{n_2}\right)\right)$$ Equation 2

Here, $\Delta X_{min}$ refers to the minimum horizontal separation distance at which the second end point P2 of the bottom surface DS is separated from the first end point P2 of the bottom surface DS, $n_1$ refers to the refractive index of air, 1.0, $n_2$ refers to the refractive index of the electric field guide EG, '$\theta_{max}$' refers to the maximum refractive angle, and T refers to the thickness of the electric field guide EG.

For an example, when the refractive index of the electric field guide EG is 1.5, $\theta_{max}$ may be 41.8° according to the Equation 1, and $\Delta X_{min}$ may be about 0.89 T according to the Equation 2. This means that when the refractive index of the electric field guide EG is 1.5, the horizontal separation distance ($\Delta X$) between the first end point P1 of the bottom surface DS and the second end point P2 of the top surface US may be 0.9 T or more.

The minimum horizontal separation distance at which the first end point P1 of the bottom surface DS is separated from the second end point P2 of the top surface US may mean the minimum overlap area, in the plane view, between the first ink storage portion IS1 and the second ink storage portion IS2. When the overlapped area between the first ink storage portion IS1 and the second ink storage portion IS2 is less than $\Delta X_{min}$, there may be a case in which light that is refracted after incident to the electric field guide EG may not be completely blocked, in the light blocking mode.

In one embodiment, the first ink storage portion IS1 and the second ink storage portion IS2 have a cross-sectional shape in which each circumference areas of the first ink storage portion IS1 and the second ink storage portion IS2 may be overlapped with a certain area. In one embodiment, the first maximum light transmitting portion XO1 and the second maximum light transmitting portion XO2 may be overlapped in the plan view and the overlapped area may have a certain area. In the first embodiment, the first maximum light transmitting portion XO1 and the second maximum light transmitting portion XO2 may have the square shape in the plan view, but it is not limited thereto. In another example, in the cases of overlapping arrangements such as an equilateral triangle or a regular hexagon, it may have a polygonal shape that may overlap a certain area on all sides.

In this application, in one embodiment, the first slope surface S1 of the first ink storage portion IS1 and the second slope surface S2 of the second ink storage portion IS2 in the electric field guide EG may be parallel each other. For example, the first ink storage portion IS1 and the second ink storage portion IS2 may be formed to be offset and crossed (or misaligned, or staggered) in space from each other by forming the same mold by an imprinting method.

The first slope surface S1 of the first ink storage portion IS1 and the second slope surface S2 of the second ink storage portion IS2 in which the first ink storage portion IS1 and the second ink storage portion IS2 may be closely neighboring and misaligned, may be parallel each other. For an example, in one embodiment, the tilt angle α between the first slope surface S1 of the first ink storage portion IS1 and the bottom surface DS may be greater than (90°+φ). For an instance, when it is decided the case of $\theta_{max}$=φ=42°, the tilt angle α of the first slope surface S1 may be greater than (90°+$\theta_{max}$).

In FIG. 5, the tilt angle α of the first slope surface S1 with respect to the top surface US may be an obtuse angle. On the contrary, the tilt angle α' of the first slope surface S1 with respect to the first maximum light transmitting portion XO1 may be an acute angle. In one embodiment, the tilt angle α' of the first slope surface S1 with respect to the first maximum light transmitting portion XO1 may be smaller than (90°−φ). For an instance, when it is defined as $\theta_{max}$=φ=42°, in one embodiment, the acute tilt angle α' of the first slope surface S1 may be less than (90°−θ$_{max}$). Further, the tilt angle of the second slope surface S2 of the second ink storage portion IS2 may be same with the tilt angle of the first slope surface S1, so the explanation will not be duplicated.

The sizes of the first ink storage portion IS1 and the second ink storage portion IS2 may be decided by considering the light transmittance ratio of the light shutter panel LST. The light transmittance ratio may be decided by the relationship between the plane surface area of the light shutter panel LST and the sum of the plane areas of the all the minimum light blocking portion IB. For example, when the plane surface area of the light shutter panel LST refers to 100, in the case that the sum of the plane areas of all the minimum light blocking portion IB is 30, the light transmittance ratio may be 70%.

In order to increase the light transmittance ratio, in one embodiment, the first minimum light blocking portion IB1 may have smaller size as possible with satisfying the condition of the Equation 1 or Equation 2. For example, in one embodiment, the acute tilt angle α' of the first slope surface S1 of the first ink storage portion IS1 may be any one of angle in range of ⅓ to ⅔ of (90°−θ$_{max}$). In this case, by calculation, the obtuse tilt angle α of the first slope surface S1 of the first ink storage portion IS1 may be in the range of (120°+(⅔) θ$_{max}$) to (150°+(⅓)θ$_{max}$).

Figure 6:
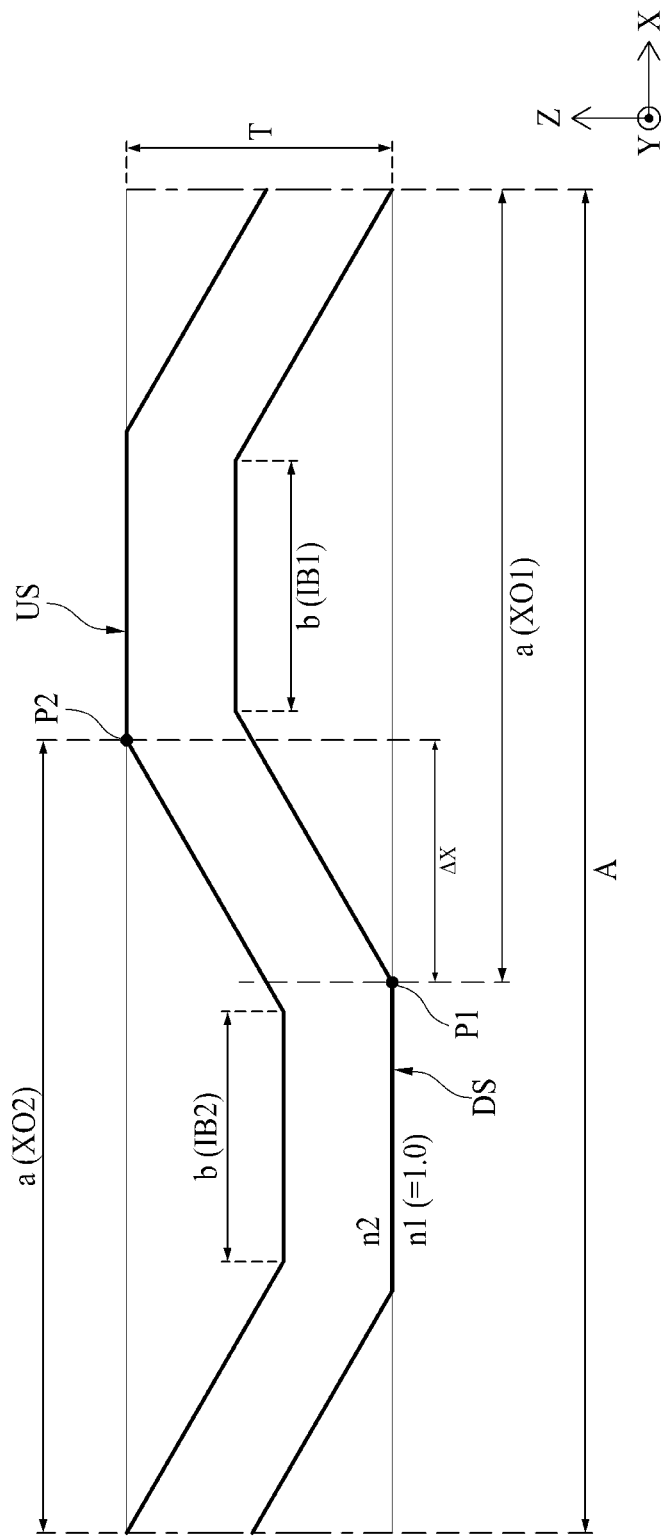
FIG. 6 is an enlarged cross-sectional view illustrating an example for design idea of light shutter layer according to the first embodiment of the present disclosure.

Referring to FIG. 6, one example for deciding the light transmittance ratio of the light shutter panel LST according to the first embodiment of the present disclosure will be explained. FIG. 6 is an enlarged cross-sectional view illustrating an example for design idea of light shutter layer according to the first embodiment of the present disclosure.

As the first ink storage portion IS1 and the second ink storage portion IS2 are overlapped each other, this overlapped one group of first ink storage portion IS1 and one second ink storage portion IS2 may be referred to as a unit pattern. Here, the reference number 'A' may refer to a length of the unit pattern, the reference number 'a' may refer to the length of one of the first maximum light transmitting portion XO1 or one of the second maximum light transmitting portion XO2, and the reference number 'b' may refer to the length of one first minimum light blocking portion IB1 or one second minimum light blocking portion IB2. T may refer to the thickness of the electric field guide EG. AX may refer to the horizontal separation distance between the first end point P1 of the bottom surface DS and the second end point P2 of the top surface US, which is decided by the Equation 2 with the thickness T and the refractive index n2 of the electric field guide EG.

Accordingly, in order to design the electric field guide EG having the light transmittance ratio of M % and light blocking ratio of N % (M %+N %=100%), a relationship equation may be calculated as Equation 3.

$$A^2 : 2b^2 = 100 : N, \therefore A = 10\sqrt{\frac{2}{N}}b \quad \text{Equation 3}$$

$$A = 2a - \Delta X$$

$$a = 5\sqrt{\frac{N}{2}b + \frac{\Delta X}{2}}$$

$$a = 5\sqrt{\frac{N}{2}b + \frac{T}{2} \cdot \tan\left(\arcsin\left(\frac{1}{n_2}\right)\right)}$$

In order to decide the light transmittance ratio of N %, the relationship between the length 'a' of the maximum light transmitting portion and length 'b' of the minimum light blocking portion, in the electric field guide EG having thickness of 'T' may be calculated from Equation 3. It is required that all charged black particles are concentrated within a minimum plane area. Therefore, it is preferable that the 'b' is decided by the density of the charged black particles and then 'a' is decided by 'b'. Accordingly, 'a' is expressed as a function of 'b', in Equation 3.

For an example, when the electric field guide EG is formed by a transparent resin material having n$_2$=1.5 and setting the light transmittance ratio to 75% and the light blocking ratio to 25%, the electric field guide EG may be designed so as to satisfy the condition represented in Equation 4.

$$a = \sqrt{2}b + 0.45T \quad \text{Equation 4}$$

As the result, in the light blocking mode, the lights incident into the first ink storage portion IS1 among the lights incident into the electric field guide EG from under outside may be blocked by the first black ink IK1. Further, in the light blocking mode, all of the light incident into the bottom surface DS among the light incident into the electric field guide EG from under outside may be refracted into the second ink storage portion IS2. As the second black ink IK2 filled within the second ink storage portion IS2 may have the same refractive index with the electric field guide EG, the refracted lights may not be reflected by the second slope surface S2, but be incident into the second ink storage portion IS2. That is, all of the light incident into the electric field guide EG through the bottom surface DS may be absorbed and/or blocked by the second black ink IK2. The shutter layer STL according to the first embodiment of the present disclosure has the features satisfying the above-mentioned conditions so that all incident lights may be perfectly blocked in the light blocking mode.

Figure 7A:
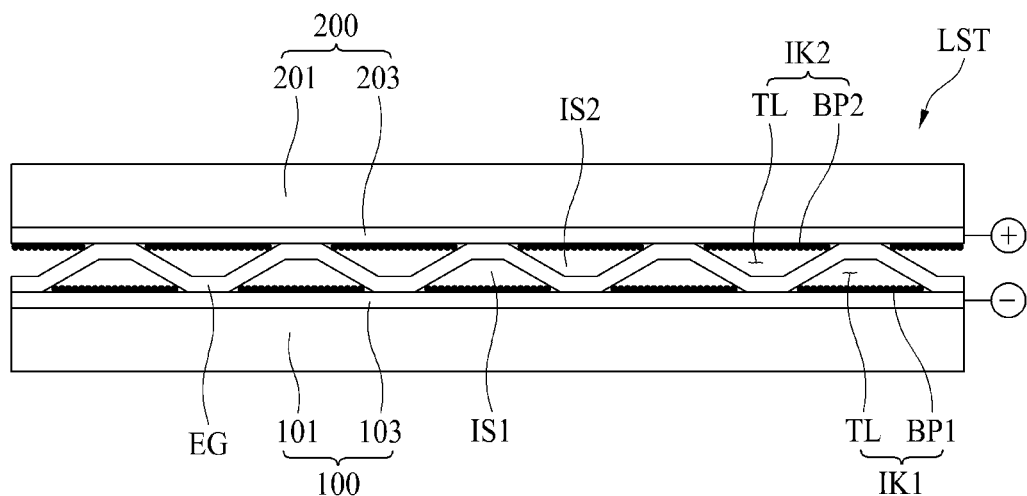
FIGS. 7A and 7B are cross-sectional views, along cutting line I-I' in FIG. 4A, illustrating the operations of the light shutter panel according to the first embodiment of the present disclosure.
Figure 7B:
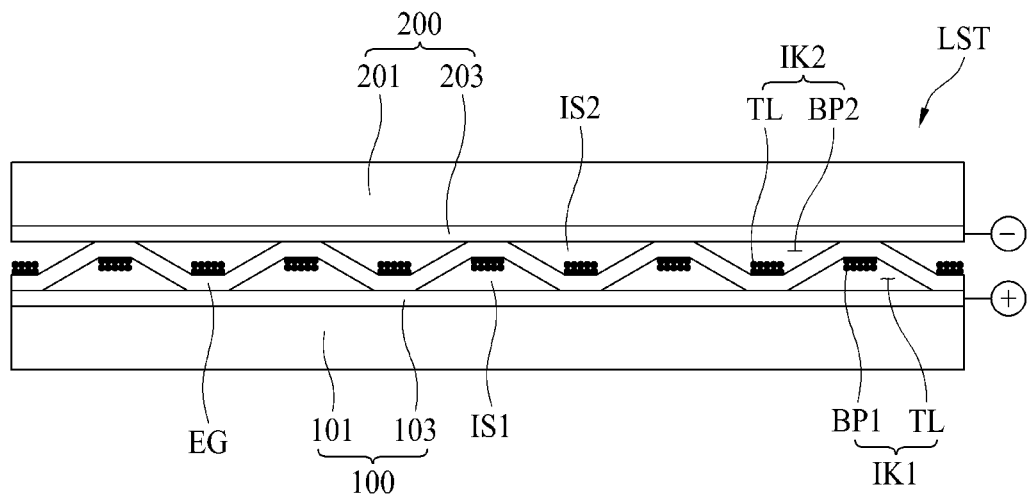

Hereinafter referring to FIGS. 7A and 7B, an operating mechanism of the light shutter panel LST according to the first embodiment of the present disclosure will be explained. FIGS. 7A and 7B are cross-sectional views, along cutting line I-I' in FIG. 4A, illustrating the operations of the light shutter panel according to the first embodiment of the present disclosure.

In the normal state as shown in FIGS. 4C and 5, the first charged black particle BP1 of the first black ink IK1 may be charged with the positive ions, and be uniformly or evenly dispersed within the transparent fluid TL. Further, the second charged black particle BP2 of the second black ink 1K2 may be charged with the negative ions, and be uniformly or evenly dispersed within the transparent fluid TL.

The normal state may mean that no electric field is applied to the lower transparent electrode layer 103 and the upper transparent electrode layer 203. In this case, as the first charged black particle BP1 and the second charged black particle BP2 are evenly dispersed within the first ink storage portion IS1 and the second ink storage portion IS2, respectively, the light shutter panel LST may be in the light blocking mode. For the case of FIG. 4C, the light incident into the shutter layer STL may be scattered by the first charged black particle BP1 and the second charged black particle BP2 dispersed within the first ink storage portion IS1 and second ink storage portion IS2, so a little amount of the light may be leaked out of the upper direction.

Hereinafter referring to FIG. 7A, the light blocking mode has no leakage light. FIG. 7A is a cross sectional view illustrating one example of the light blocking mode in the light shutter panel LST according to the first embodiment of the present disclosure. A negative common voltage may be applied to the lower transparent electrode layer 103 and a positive driving voltage may be applied to the upper transparent electrode layer 203. In that case, the first charged black particles BP1 charged with the positive ions may move or shift to the lower transparent electrode layer 103. At the same time, the second charged black particles BP2 charged with the negative ions may move or shift to the upper transparent electrode layer 203. As the first charged black particles BP1 are uniformed disposed over the whole plane surface area of the lower transparent electrode layer 103, and the second charged black particles BP2 are uniformed disposed over the plane whole surface area of the upper transparent electrode layer 203. Therefore, the shutter layer STL may be in the light blocking mode. In that case, the first charged black particles BP1 and the second charged black particles BP2 are crowed at the first maximum light transmitting portion XO1 and the second maximum light transmitting portion XO2, respectively. Accordingly, the light blocking mode may have no light leakage in which the incident lights may not be scattered, but be blocked by the first charged black particles BP1 and the second charged black particles BP2.

FIG. 7B is a cross sectional view illustrating the light transmitting mode of the light shutter panel LST according to the first embodiment of the present disclosure. Referring to FIG. 7B, the first charged black particles BP1 of the first black ink IK1 may be charged with the positive ions, and the second charged black particles BP2 of the second black ink IK2 may be charged with the negative ions. A positive (+) driving voltage may be applied to the lower transparent electrode layer 103 and a negative (−) common voltage may be applied to the upper transparent electrode layer 203. In this case, the first charge black particles BP1 charged with the positive ions may be moved and concentrated in a place far away from the lower transparent electrode layer 103. That is, the first charge black particles BP1 may be concentratedly gathered within the first minimum light blocking portion IB1 of the first ink storage portion IS1. At the same time, the second charge black particles BP2 may be concentratedly gathered within the second minimum light blocking portion IB2 of the second ink storage portion IS2. As the result, the areas of the first minimum light blocking portion IB1 and the second minimum light blocking portion IB2 may be in the light blocking state, and other areas may be in the light transmitting state. At the plane areas of the electric field guide EG excepting the minimum light blocking portions IB, all lights incident from the under part of the light shutter panel LST may pass through to the upper part of the light shutter panel LST.

Even though it is not shown in figures, the light shutter panel LST according to the first embodiment of the present disclosure may further include a common pad for receiving the common voltage and a driving pad for receiving the driving voltage. The common pad and the driving pad may be disposed at the outside of the light shutter panel LST. Supplying the driving signals from the external driving apparatus, the arrangement states of the first black ink IK1 and the second black ink IK2 may be controlled.

Second Embodiment

Figure 8A:
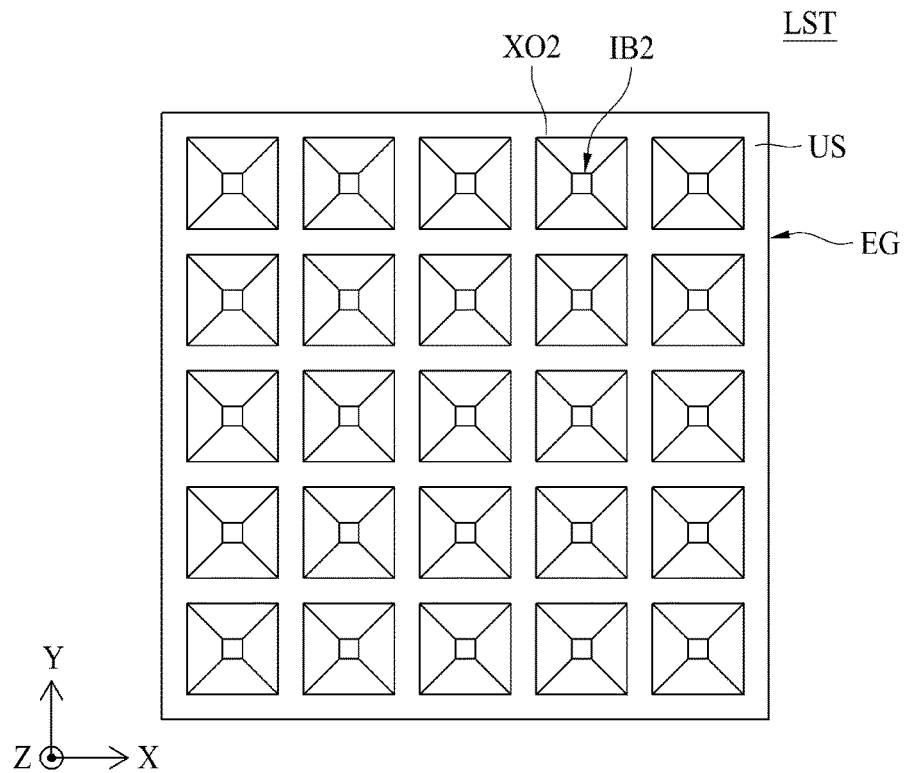
FIG. 8A is an enlarged cross-sectional view illustrating a structure of the light shutter panel according to a second embodiment of the present disclosure.
Figure 8B:
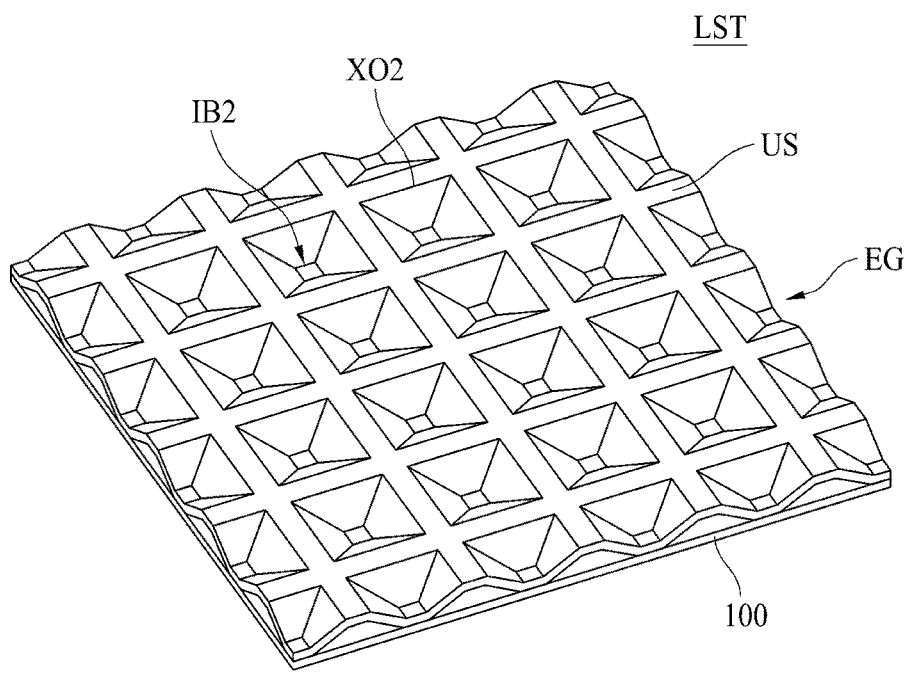
FIG. 8B is a perspective view illustrating a structure of the light shutter panel according to the second embodiment of the present disclosure.

Hereinafter, referring to FIGS. 8A and 8B, a light shutter panel according to the second embodiment of the present disclosure will be explained. FIG. 8A is an enlarged cross-sectional view illustrating a structure of the light shutter panel according to the second embodiment of the present disclosure. FIG. 8B is a perspective view illustrating a structure of the light shutter panel according to the second embodiment of the present disclosure. The cross-sectional structure may be same as the first embodiment, so FIG. 4C may be referred for explaining the structural elements in the cross-sectional view of the second embodiment which are not shown in FIGS. 8A and 8B.

A light shutter panel LST according to the second embodiment may comprise a lower electrode plate 100, an upper electrode plate 200, a shutter layer STL, a first black ink IK1 and a second black ink IK2. The lower electrode plate 100 and the upper electrode plate 200 may be attached as facing each other with a predetermined distance.

The shutter layer STL may include a top surface US, a bottom surface DS, a first maximum light transmitting portion XO1, a second maximum light transmitting portion XO2, a first minimum light blocking portion IBL a second minimum light blocking portion IB2, a first ink storage portion IS1, a second ink storage portion IS2 and an electric field guide EG. In FIG. 8B, in convenience, only the lower electrode plate 100 is shown as being attached at the bottom surface DS, and the upper electrode plate 200 is not shown. The main elements for the shutter layer STL may include the electric field guide EG, the first ink storage portion IS1 and the second ink storage portion IS2. Other elements may be the elements for defining the first ink storage portion IS1 and the second ink storage portion IS2.

The first ink storage portion IS1 may be a space formed by depression of a first height h1 inward from the bottom surface DS of the shutter layer STL. The second ink storage portion IS2 may be a space formed by depression of a second height h2 inward from the top surface US of the shutter layer STL. The first ink storage portion IS1 and the second ink storage portion IS2 may be the spaces formed at the electric field guide EG. Especially, the first ink storage portion IS1 may be disposed at the lower portions based on the intermediate height of the electric field guide EG. The second ink storage portion IS2 may be disposed at the upper portions based on the intermediate height of the electric field guide EG.

A plurality of the first maximum light transmitting portion XO1 may be arrayed in a matrix manner with a predetermined distance at the lower portions of the electric field guide EG. Between neighboring two of the plurality of the first maximum light transmitting portions XO1, the bottom surface DS may be disposed. A plurality of the second maximum light transmitting portion XO2 may be arrayed in a matrix manner with a predetermined distance at the upper portions of the electric field guide EG. Between neighboring two of the plurality of the second maximum light transmitting portions XO2, the top surface US may be disposed. The top surface US and the bottom surface DS may be arrayed as the mesh structure. The top surface US and the bottom surface DS are arrayed in a spatially crossed or staggered manner. For example, the top surface US may be disposed as overlapping with the center of the first maximum light transmitting portion XO1 formed at the bottom surface DS in a '+' shape.

One of the first minimum light blocking portion IB1 may be disposed at a position depressed in a certain depth from the bottom surface DS to the inside of the electric field guide EG. One of the second minimum light blocking portion IB2 may be disposed at a position depressed in a certain depth from the top surface US to the inside of the electric field guide EG. For example, the first minimum light blocking portion IB1 may be overlapped with the middle portion of the first maximum light transmitting portion XO1. Further, the second minimum light blocking portion IB2 may be overlapped with the middle portion of the second maximum light transmitting portion XO2.

According to the second embodiment, unlike the first embodiment, the first maximum light transmitting portion XO1 and the second maximum light transmitting portion XO2 may be continuously arranged at predetermined intervals (or distance). Although there is a difference in the arrangement manner as described above, in both the first and the second embodiments, the bottom surface DS and the top surface US may have a structural characteristic surrounded by the portions where the first maximum light transmitting portion XO1 and the second maximum light transmitting portion XO2 overlap. The amount of the overlapping of the first maximum light transmitting portion XO1 and the second maximum light transmitting portion XO2 may be the same with the description explained with FIG. 5.

The top surface US and the bottom surface DS may have the same size and shape. By the shape and the arrangement structure of the first maximum light transmitting portion XO1, the shape of the bottom surface DS may be defined. Further, by the shape and the arrangement structure of the second maximum light transmitting portion XO2, the shape of the top surface US may be defined.

Third Embodiment

Figure 9:
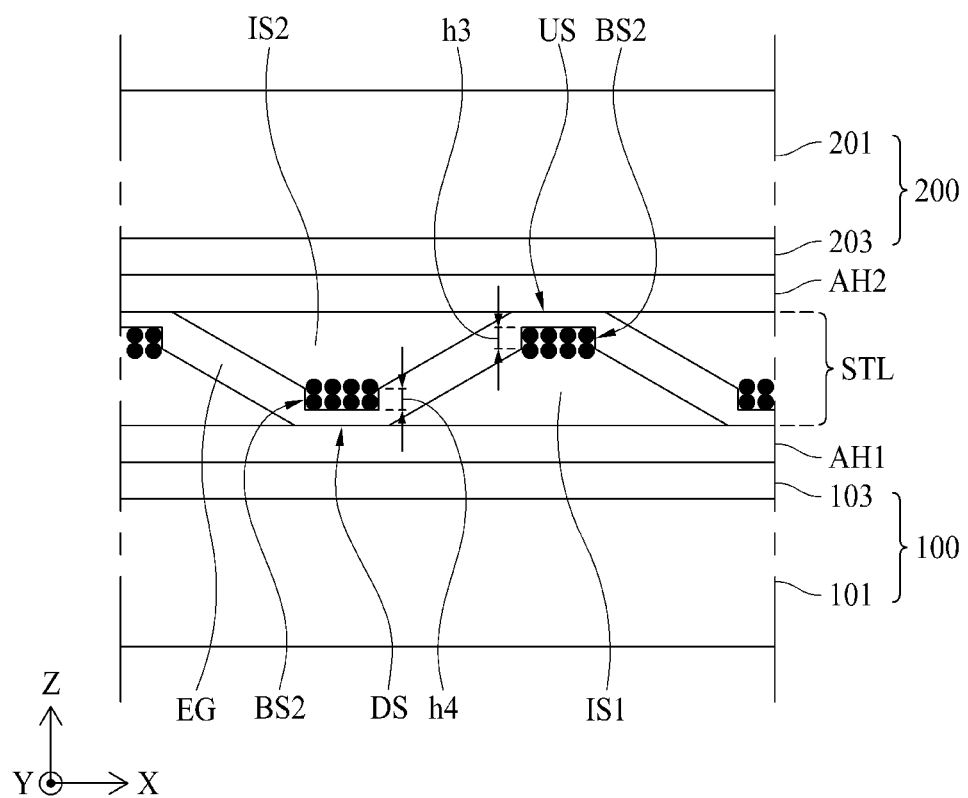
FIG. 9 is an enlarged cross-sectional view illustrating various structures of the light shutter panel according to a third embodiment of the present disclosure.

Hereinafter referring to FIG. 9, a light shutter panel according to the third embodiment of the present disclosure will be explained. FIG. 9 is an enlarged cross-sectional view illustrating various structures of the light shutter panel according to the third embodiment of the present disclosure.

Referring to FIG. 9, a structure of the light shutter panel according to the third embodiment may be very similar with that of the first embodiment. Therefore, the explanation for the elements not shown in FIG. 9 may be referred to FIG. 4C, 5, 6, 7A or 7B. The difference may be that the light shutter panel LST according to the third embodiment may further include a first black particle storage portion BS1 and a second black particle storage portion BS2. The first black particle storage portion BS1 may defined as a space in which the first minimum light blocking portion IB1 extends and is depressed into the electric field guide EG with a third depth h3. In the light transmitting mode, all of the first charged black particle BP1 may be gathered within the first black particle storage portion BS1. The plane area of the first black particle storage portion BS1 may be same with the minimum plane area of the first minimum light blocking portion IB1 regardless of the height position, so it is possible to ensure the maximum light transmittance ratio.

Likewise, the second black particle storage portion BS2 may defined as a space in which the second minimum light blocking portion IB2 extends and is depressed into the electric field guide EG with a fourth depth h4. Here, the fourth depth h4 may be equal to the third depth h3. In the light transmitting mode, all of the second charged black particle BP2 may be gathered within the second black particle storage portion BS2. The plane area of the second black particle storage portion BS2 may be same with the plane minimum area of the second minimum light blocking portion IB2 regardless of the height position, so it is possible to ensure the maximum light transmittance ratio.

Fourth Embodiment

Figure 10A:
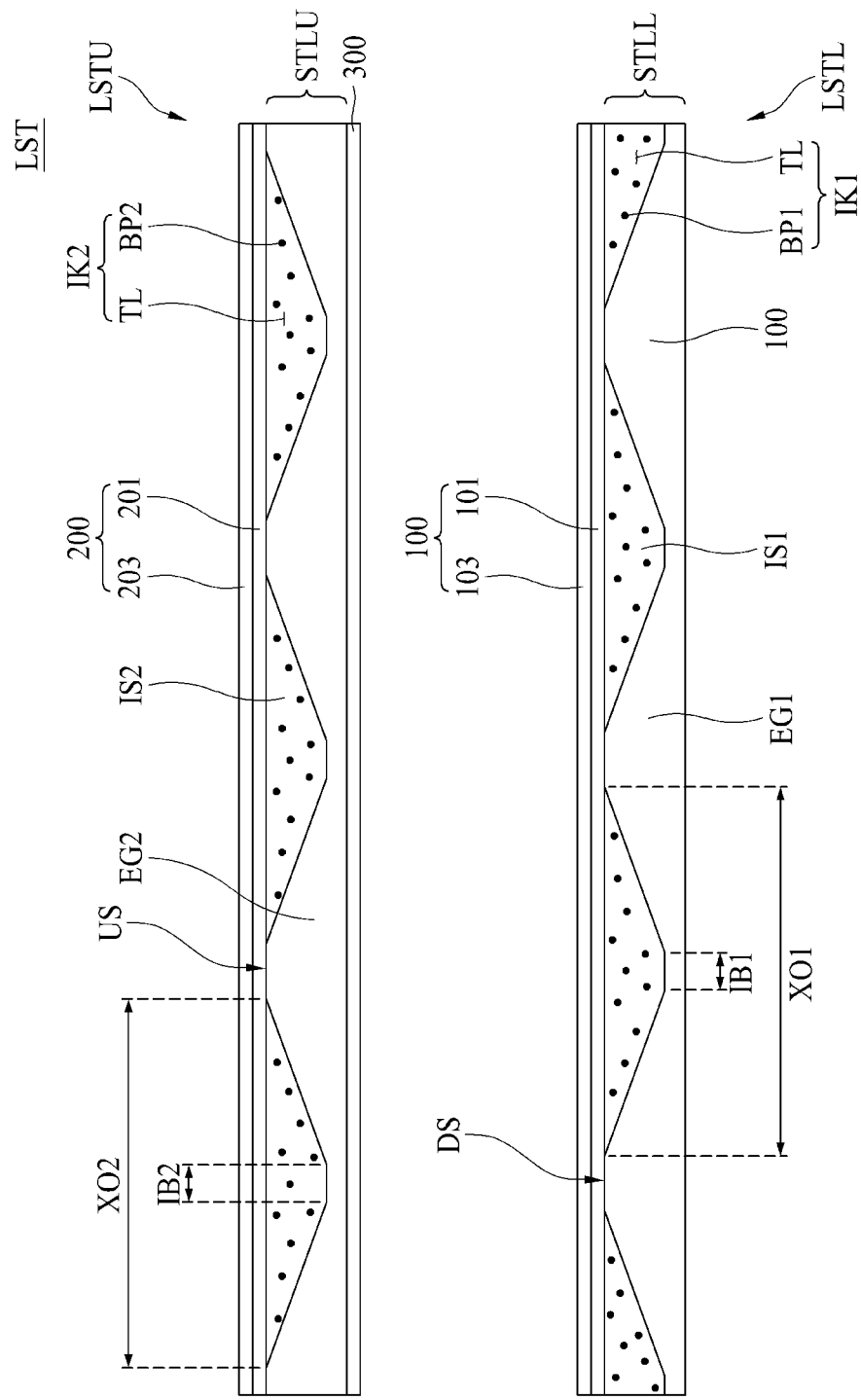
FIGS. 10A and 10B are cross-sectional views illustrating structures of light shutter panels according to a fourth embodiment of the present disclosure.
Figure 10B:
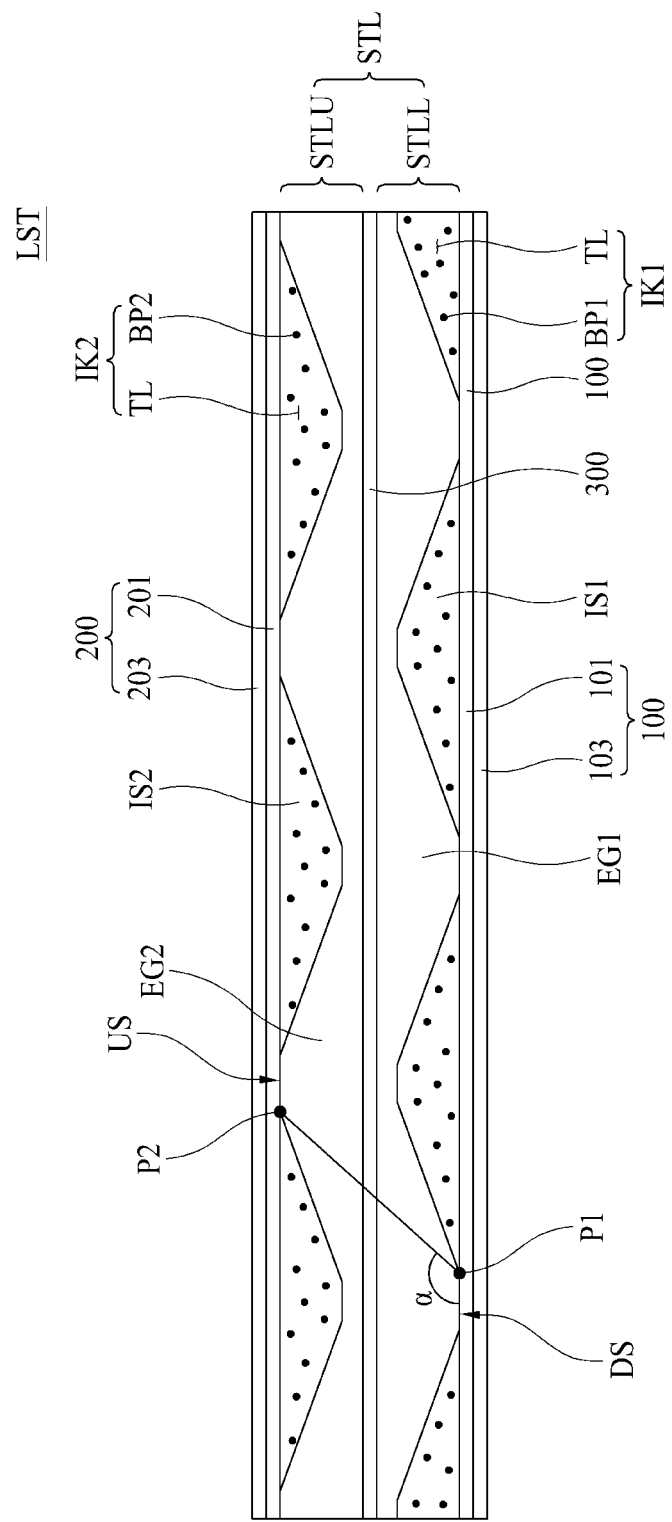

Hereinafter referring to FIGS. 10A and 10B, a light shutter panel according to the fourth embodiment of the present disclosure will be explained. FIGS. 10A and 10B are cross-sectional views illustrating structures of light shutter panels according to the fourth embodiment of the present disclosure. FIG. 10A shows a state in which the upper part and the lower part of the light shutter panel according to the fourth embodiment are separated. FIG. 10B shows a state of the shutter panel completely manufactured by assembling the upper part with the lower part of the light shutter panel according to the fourth embodiment. The plane structure of the fourth embodiment may be same as that of the first embodiment or the second embodiment.

Referring to FIGS. 10A and 10B, a light shutter panel LST according to the fourth embodiment of the present disclosure may include two shutter layers STL explained in the first embodiment or the second embodiment. For example, the light shutter panel LST may comprise a lower shutter panel LSTL, an upper shutter panel LSTU, and a common electrode layer (or common electrode plate) 300 disposed therebetween.

The finally assembled light shutter panel LST according to the fourth embodiment of the present disclosure may comprise a lower electrode plate 100, a common electrode layer (or common electrode plate) 300, an upper electrode plate 200, a lower shutter layer STLL, an upper shutter layer STLU, a first black ink IK1 and a second black ink IK2, as shown in FIG. 10B. The lower shutter panel LSTL may include the lower electrode plate 100, the lower shutter layer STLL and the first black ink IK1. The upper shutter panel LSTU may include the upper electrode plate 200, the upper shutter layer STLU and the second black ink IK2.

The lower electrode plate 100 and the upper electrode plate 200 may be attached as facing each other with the common electrode layer 300 there-between. For example, the lower electrode plate 100 may be face to the lower surface of the common electrode layer 300, and the upper electrode plate 200 may be face to the upper surface of the common electrode layer 300.

The lower shutter layer STLL may include a first maximum light transmitting portion XO1, a first minimum light blocking portion IB1, a first electric field guide EG1 and a first ink storage portion IS1. Applying a molding process with a transparent plastic material for the first electric field guide EG1, the first ink storage portion IS1 may be formed. The first ink storage portion IS1 may be a space connecting the first maximum light transmitting portion XO1 and the first minimum light blocking portion IB1. A plurality of the first ink storage portions IS1 may be arrayed in succession, and the first electric field guide EG1 made of a material having higher refractive index than air may be disposed between two neighboring first ink storage portions IS1.

The first electric field guide EG1 may have a structure in which the bottom surface DS is bonded with the lower electrode plate 100. Therefore, the bottom surface DS may be disposed on the same plane with the first maximum light transmitting portion XO1. The first black ink IK1 may be filled into the first ink storage portion IS1 formed at the first electric field guide EG1.

The upper shutter layer STLU may include a second maximum light transmitting portion XO2, a second minimum light blocking portion IB2, a second electric field guide EG2 and a second ink storage portion IS2. Applying a molding process with a transparent plastic material for the second electric field guide EG2, the second ink storage portion IS2 may be formed. The second ink storage portion IS2 may be a space connecting the second maximum light transmitting portion XO2 and the second minimum light blocking portion IB2. A plurality of the second ink storage portions IS2 may be arrayed in succession, and the second electric field guide EG2 made of a material having higher refractive index than air may be disposed between two neighboring second ink storage portions IS2.

The second electric field guide EG2 may have a structure in which the top surface US is bonded with the upper electrode plate 200. Therefore, the top surface US may be disposed on the same plane with the second maximum light transmitting portion XO2. The second black ink IK2 may be filled into the second ink storage portion IS2 formed at the second electric field guide EG2.

For the manufacturing method, the second electric field guide EG2 may be formed with a molding process using a transparent plastic plate. After filling the second black ink IK2 within the second ink storage portion IS2, the upper electrode plate 200 may be bonded with the top surface US. Turning this over, the common electrode layer 300 is deposited on the whole outer surface of the second electric field guide EG2. As the result, the upper shutter panel LSTU may be completed. In another example, the common electrode layer 300 may be firstly formed at one surface of the second electric field guide EG2, and turning it over, then the second ink storage portion IS2 may be formed with the molding process.

With the same method, the lower shutter panel LSTL may be manufactured. For example, the first electric field guide EG1 may be made by forming the first ink storage portion IS1 at one surface of a transparent plastic plate with the molding process. Then, filling the first black ink IK1 within the first ink storage portion IS1, the lower electrode plate 100 may be bonded to the bottom surface DS.

Then, turning the lower shutter panel LSTL over, the bottom surface of the first electric field guide EG1 may be bonded to the common electrode layer 300. Here, in one embodiment the first minimum light blocking portion IB1 of the first electric field guide EG1 may be overlapped with the top surface US of the second electric field guide EG2, and the second minimum light blocking portion IB2 of the second electric field guide EG2 may be overlapped with the bottom surface DS of the first electric field guide EG1. Further, in one embodiment the overlapping relationship between the first maximum light transmitting portion XO1 and the second maximum light transmitting portion XO2 may be satisfied, as explained with Equation 1.

For an example, one end of the first maximum light transmitting portion XO1 may match with one end of the bottom surface DS. Therefore, as explained in the first embodiment, the tilt angle of the slope line connecting from the first end point P1 of the bottom surface DS to the second end point of the top surface US may be greater than the $\theta_{max}$ defined by considering the refraction indices of the first electric field guide EG1 and the second electric field guide EG2.

Further, in one embodiment the condition of the horizontal separation distance $\Delta X_{min}$ between the first end point P1 of the bottom surface DS and the second end point P2 of the top surface US may be satisfied as explained with Equation 2. By joining the lower shutter panel LSTL and the upper shutter panel LSTU, the light shutter panel LST according to the fourth embodiment may be completed.

The first charged black particle BP1 of the first black ink IK1 filled into the first ink storage portion IS1 may be charged with the same ions as the second charged black particle BP2 of the second black ink IK2 filled into the second ink storage portion IS2. The first minimum light blocking portion IB1 and the second minimum light blocking portion IB2 are disposed as being close to the common electrode layer 300, so the distribution of the first charged black particle BP1 and the second charged black particle BP2 may be controlled by the polarity of the electric field applied to the common electrode layer 300.

For example, the negative common voltage may be applied to the common electrode layer 300. At the same time, the positive driving voltage may be applied to the lower transparent electrode layer 103 and the upper transparent electrode layer 203. Here, in one embodiment the first charged black particle BP1 and the second charged black particle BP2 may be charged with the positive ions. In the normal state in which there is no electric field, the light shutter panel LST may be in the light blocking mode in which the first charged black particle BP1 and the second charged black particle BP2 may be evenly dispersed within the first ink storage portion IS1 and the second ink storage portion IS2, respectively. When applying the positive voltage to the lower transparent electrode layer 103 and upper transparent electrode layer 203, and applying the negative voltage to the common electrode layer 300, the light shutter panel LST may be in the light transmitting mode in which the first charged black particle BP1 and the second charged black particle BP2 may be concentrated within the first minimum light blocking portion IB1 and the second minimum light blocking portion IB2, respectively.

In summary, the light shutter panel according to the present disclosure may include the first ink storage portion IS1 and the second ink storage portion IS2 formed at one surface and opposite surface, respectively, of the transparent electric field guide EG having higher refractive index than air. At one surface and the opposite surface of the electric field guide EG, the lower transparent electrode layer 103 and the upper transparent electrode layer 203 may be attached. therefore, the gap of the light shutter panel LST may be constantly and/or uniformly maintained as corresponding to the thickness of the electric field guide EG. In one embodiment, the incident light from the rear side of the light shutter panel LST should not go out of the front side of the light shutter panel LST, in the light blocking mode. Therefore, in one embodiment, the first ink storage portion IS1 may be overlapped with the second ink storage portion IS2. Further, the overlapping amount may be decided by considering the maximum refractive angle in accordance with the refractive index of the electric field guide EG in order that there is no light leakage through the electric field guide EG.

The electric field guide EG may be an element having a structure to prevent or reduce the electric field from being distorted when the electric field is formed in the first ink storage portion IS1 and the second ink storage portion IS2. In addition, the electric field guide EG may also be an element having a structure to prevent or reduce distortion from occurring when the first charged black particle BP1 and the second charged black particle BP2 are changed the distribution state such as the maximum dispersion state or to the minimum dispersion state. Therefore, the electric field guide EG may be called as a 'charged black particle guide' or a 'light blocking portion guide'.

As explained with FIG. 1, the light shutter panel LST may be disposed at the rear side of the transparent display panel DIP. Each of the first maximum light transmitting portion XO1 and the second maximum light transmitting portion XO2 of the light shutter panel LST may be disposed as covering a plurality of the unit pixels UP of the transparent display panel DIP. For example, when the transparent display panel DIP may have a high-resolution specification over 300 dpi (dot per inch), one of the first maximum light transmitting portion XO1 and the second maximum light transmitting portion XO2 may be disposed as being allocated to hundreds or thousands of unit pixels UP. In this case, each first minimum light blocking portion IB1 and second minimum light blocking portion IB2 may be disposed as being allocated to tens of unit pixels UP. The light shutter panel LST may be applied to the transparent display panel DIP having the high-resolution specification. Therefore, the light shutter panel LST may be joined and arranged with the transparent display panel DIP without considering the relationship of the structure or the arrangement between the shutter layer and the unit pixels.

Features, structures, effects and so on described in the above described examples of the present disclosure are included in at least one example of the present disclosure, and are not necessarily limited to only one example. Furthermore, features, structures, effects and so on exemplified in at least one example of the present disclosure may be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A light shutter panel comprising:
a lower electrode plate;
an upper electrode plate facing the lower electrode plate;
a shutter layer disposed between the lower electrode plate and the upper electrode plate,
the shutter layer including a first ink storage portion disposed at a lower part of the shutter layer, a second ink storage portion disposed at an upper part of the shutter layer and overlapped with the first ink storage portion, and an electric field guide disposed between the first ink storage portion and the second ink storage portion;
a first black ink filled into the first ink storage portion; and
a second black ink filled into the second ink storage portion,
wherein a first minimum light blocking portion of the first ink storage portion is separated from a second minimum light blocking portion of the second ink storage portion in a horizontal direction of a plane of the electric field guide.

2. The light shutter panel according to claim 1, wherein the lower electrode plate includes:
a lower transparent substrate; and
a lower transparent electrode layer disposed on a whole upper surface of the lower transparent substrate,
wherein the upper electrode plate includes:
an upper transparent substrate; and
an upper transparent electrode layer disposed on a whole upper surface of the upper transparent substrate,
wherein the lower electrode plate and the upper electrode plate are joined to each other as facing the lower transparent electrode layer and the upper transparent electrode layer.

3. The light shutter panel according to claim 1, wherein the electric field guide includes:
a top surface;
a bottom surface having a same size and a same shape as the top surface, the bottom surface parallel with the top surface;
a plurality of first maximum light transmitting portions defining a shape of the bottom surface;
a plurality of second maximum light transmitting portions defining a shape of the top surface;
the first minimum light blocking portion depressed into the electric field guide from each of the plurality of first maximum light transmitting portions;
the second minimum light blocking portion depressed into the electric field guide from each of the plurality of second maximum light transmitting portions;
a first slope surface connecting the plurality of first maximum light transmitting portions and the first minimum light blocking portion; and
a second slope surface connecting the plurality of second maximum light transmitting portions and the second minimum light blocking portion.

4. The light shutter panel according to claim 3, wherein the first ink storage portion is defined by the plurality of first maximum light transmitting portions, a plurality of first minimum light blocking portions and the first slope surface,
wherein the second ink storage portion is defined by the plurality of second maximum light transmitting portions, the second minimum light blocking portion and the second slope surface, and
wherein the electric field guide defines the first ink storage portion and the second ink storage portion, and includes a material having a refractive index higher than air.

5. The light shutter panel according to claim 3, wherein a straight line connecting a first end point of the bottom surface to a second end point of the top surface has a tilt angle greater than a refractive angle of a refracted light going through the electric field guide after refracted at the first end point of the bottom surface.

6. The light shutter panel according to claim 5, wherein an obtuse angle between the first slope surface and the bottom surface is greater than $(90°+\theta_{max})$, wherein $\theta_{max}$ is a maximum refracted angle of the refracted light going through the electric field guide after refracted at the first end point of the bottom surface.

7. The light shutter panel according to claim 6, wherein an acute angle between the first slope surface and the top surface is selected any one in range from ⅓ of $(90°-\theta_{max})$ to ⅔ of $(90°-\theta_{max})$.

8. The light shutter panel according to claim 5, wherein a minimum separation distance, $\Delta X_{min}$, between the first end point of the bottom surface and the second end point of the top surface is defined by following equation, $$\Delta X_{min} = T \cdot \tan\theta_{max} = T \cdot \tan\left(\arcsin\left(\frac{n_1}{n_2}\right)\right),$$

wherein, $n_1$ refers to a refractive index of air (=1.0), $n_2$ refers to a refractive index of the electric field guide, $\theta_{max}$ is a maximum refracted angle of the refracted light going through the electric field guide after refracted at the first end point of the bottom surface, and T is a thickness of the electric field guide.

9. The light shutter panel according to claim 3, wherein the top surface and the bottom surface are surrounded by overlapped areas of the plurality of first maximum light transmitting portions and the plurality of second maximum light transmitting portions.

10. The light shutter panel according to claim 3, wherein one of the top surface and the bottom surface has a mesh shape, the mesh shape having a predetermined width.

11. The light shutter panel according to claim 3, wherein the top surface and the bottom surface have island shapes of an equilateral triangle, and disposed as being staggered in a checkered manner.

12. The light shutter panel according to claim 1, wherein the first black ink includes:
a transparent fluid; and
a plurality of first charged black particles evenly dispersed in the transparent fluid, the plurality of first charged black particles charged with a first ion, and
wherein the second black ink include:
the transparent fluid; and
a plurality of second charged black particles evenly dispersed in the transparent fluid, the plurality of second charged black particles charged with a second ion that is different from the first ion.

13. The light shutter panel according to claim 12, further comprising:
a first terminal for supplying a first voltage to the lower electrode plate; and
a second terminal for supplying a second voltage to the upper electrode plate,
wherein, in a light transmitting mode,
a first voltage opposite to the first ion is applied to the lower electrode plate, and
a second voltage opposite to the second ion is applied to the upper electrode plate.

14. The light shutter panel according to claim 1, wherein a summation area of the first minimum light blocking portion and the second minimum light blocking portion is at most 30% more than a plane area of the electric field guide.

15. The light shutter panel according to claim 1, wherein the shutter layer includes:
a lower shutter layer having the first ink storage portion;
an upper shutter layer having the second ink storage portion; and
a common electrode layer disposed between the lower shutter layer and the upper shutter layer.

16. The light shutter panel according to claim 15, wherein the first black ink and the second black ink include:
a transparent fluid; and
a plurality of charged black particles evenly dispersed in the transparent fluid,
wherein, in a light transmitting mode,
a first voltage having a same polarity as a first ion is applied to the common electrode layer, and
a second voltage having opposite polarity to the first ion is applied to the upper electrode plate and the lower electrode plate.

17. A transparent display apparatus comprising:
a transparent display panel including a plurality of pixels in a matrix manner, each of pixel including an emission area and a transmission area; and
a light shutter panel including:
a lower electrode plate;
an upper electrode plate facing with the lower electrode plate;
a shutter layer disposed between the lower electrode plate and the upper electrode plate, the shutter layer including a first ink storage portion disposed at a lower part of the shutter layer, a second ink storage portion disposed at an upper part of the shutter layer and overlapped with the first ink storage portion, and an electric field guide disposed between the first ink storage portion and the second ink storage portion;
a first black ink filled into the first ink storage portion; and
a second black ink filled into the second ink storage portion,
wherein a first minimum light blocking portion of the first ink storage portion is separated from a second minimum light blocking portion of the second ink storage portion in a horizontal direction of a plane of the electric field guide.

* * * * *